United States Patent
Machani et al.

(10) Patent No.: US 9,667,416 B1
(45) Date of Patent: May 30, 2017

(54) PROTECTING MASTER ENCRYPTION KEYS IN A DISTRIBUTED COMPUTING ENVIRONMENT

(71) Applicant: EMC Corporation, Hopkinton, MA (US)

(72) Inventors: Salah Machani, Toronto (CA); Lawrence N. Friedman, Arlington, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 309 days.

(21) Appl. No.: 14/575,295

(22) Filed: Dec. 18, 2014

(51) Int. Cl.
*H04L 29/06* (2006.01)
*H04L 9/08* (2006.01)

(52) U.S. Cl.
CPC ........ *H04L 9/0822* (2013.01); *H04L 63/0428* (2013.01); *H04L 2209/24* (2013.01)

(58) Field of Classification Search
CPC ........... H04L 63/0428; H04L 63/08229; H04L 2209/24
See application file for complete search history.

(56) References Cited

U.S. PATENT DOCUMENTS

| | | | |
|---|---|---|---|
| 6,959,394 B1* | 10/2005 | Brickell | ............... H04L 9/00 713/202 |
| 8,184,813 B2 | 5/2012 | Kaji | |
| 2005/0086471 A1 | 4/2005 | Spencer | |
| 2009/0323958 A1* | 12/2009 | Schneider | ............... H04L 9/085 380/277 |

OTHER PUBLICATIONS

AES Key Wrap Specification; Nov. 2001; 23 pages.
J. Schaad; "Advanced Encryption Standard (AES) Key Wrap Algorithm"; Sep. 2002; downloaded from <https://tools.ietf.org/rvd/rfc3394> on Jul. 24, 2015; 30 pages.
Adi Shamir; "How to Share a Secret"; Nov. 1979; vol. 22; No. 11; 2 pages.

* cited by examiner

*Primary Examiner* — Jeffrey Pwu
*Assistant Examiner* — Thong Truong
(74) *Attorney, Agent, or Firm* — BainwoodHuang

(57) ABSTRACT

Protecting master encryption keys by splitting the master encryption key into multiple key shares using a polynomial secret sharing scheme, and storing one share in a remote management server and the other shares in managed devices located on one or more secure networks. To reconstruct the master encryption key, a managed device obtains the remote management server share and combines it with its local share. Master encryption keys may be obtained without an administrator's password, thus supporting unattended startup of appliances. The remote management server may alert a system administrator upon release of the remote management key share, or request approval prior to releasing the remote management key share.

20 Claims, 17 Drawing Sheets

PROTECTING MASTER ENCRYPTION KEYS IN A DISTRIBUTED COMPUTING ENVIRONMENT

BACKGROUND

As it is generally known, a cryptographic key (or simply "key") is used by an encryption circuit or logic to determine how input data is to be encrypted and/or decrypted. For example, a key may specify the particular transformation to be performed on input data during encryption, and/or the reverse process during decryption. Keys may also be used in other types of cryptographic operations, such as generating digital signatures, and/or message authentication.

Some distributed computing environments use what are known as "master encryption keys" for certain types of data encryption performed by the devices they contain. In some systems, the master encryption key is required in order to perform certain encryption operations that must occur during the start-up process for individual devices. Accordingly, a master key may be required to re-start a device after a power loss, or to set up a newly added device. Because master encryption keys are often used to perform basic, underlying encryption operations, they must be stored securely, so that the security of both the individual devices and the overall computing environment is maintained.

Previous approaches to protecting master encryption keys have required an administrator user to enter a password whenever the master encryption key is accessed. For example, some prior solutions have stored a master encryption key in a "keystore" file that cannot be accessed without an administrator user entering their password. Other previous systems requiring the administrator user password have employed a hardware security module (HSM) with an access-control mechanism (e.g. multi-part password-based, smartcard, Universal Serial Bus (USB)/token, etc.), and required client software to authenticate to the HSM in order to access the master encryption key.

SUMMARY

The prior approaches described above have significant drawbacks. In systems in which an administrator password is required to access the master encryption key, the administrator user must typically enter their password whenever a device is started up. Such a requirement that each device start-up be "attended" by a system administrator does not facilitate high-availability and/or scalability in distributed computing environments. If instead the administrator's password is simply stored on the device, and read from an unprotected file when needed, there is a general lack of security provided for the master encryption key. For these reasons and others it would be desirable to have an improved approach to maintaining a master key in a distributed computing environment that allows access to the master key without requiring an administrator user's password, that facilitates unattended startup of individual devices requiring the master encryption key, and that also maintains the master encryption key with a high degree of security.

To address these and other shortcomings of previous approaches, a new system for protecting master encryption keys is disclosed. In the disclosed system, a master encryption key is generated, and then split into multiple key shares using a polynomial secret sharing scheme. The key splitting is performed such that at least some threshold number of the resulting key shares must be combined to reconstruct the master encryption key. The threshold number of shares that must be combined to reconstruct the master encryption key may, for example, be two, or a higher number of shares may be required in order to provide a higher level of security. While the master encryption key may be split such that any of the key shares may be combined to make up the threshold number of shares needed to reconstruct it, the master encryption key may alternatively may be split such that a particular one of the resulting shares must always be part of the combination of shares used in the reconstruction.

After the master encryption key is split, the disclosed system stores at least one of the resulting key shares as a server key share in a remote management server. The other key shares are referred to as managed device key shares, and are distributed to and stored on individual managed devices located on at least one trusted network. After the key shares are distributed among the remote management server and the managed devices, the original copy of the master encryption key may be destroyed.

Each master encryption key may be generated for and associated with an enterprise that may be associated with one or more clusters of managed devices. In an embodiment in which a master encryption key is generated for each enterprise, the managed device key shares are distributed such that each cluster within an enterprise is provided a single managed device key share for the enterprise master encryption key. The managed device key share for each cluster may be stored within each managed device within the cluster. In an alternative embodiment, a master encryption key is generated for each cluster within each enterprise, and the managed device key shares distributed such that a different managed device key share is stored on each managed device within each cluster. In another alternative embodiment, a master encryption key is generated for each enterprise, and each enterprise may control multiple clusters, but the managed device key shares are distributed such that a different managed device key share is distributed to and stored by each managed device across all the clusters associated with a given enterprise.

After distribution of the key shares, when a managed device needs to reconstruct a master encryption key, it must obtain another key share in addition to the one it stores or has access to locally. In one embodiment, the managed device issues a request to the remote management server for a copy of the server key share. The request for the server key share may be sent through a secure connection established between the managed device and the remote management server. If the request is properly authenticated, the remote management server transmits the server key share to the requesting managed device over the secure connection. The requesting managed device can then combine the server key share with its local managed device key share to re-construct the master encryption key.

To provide further security with regard to releasing the server key share from the remote management server, the disclosed system may be embodied such that in response to transmitting the server key share to the managed device, an alert message is sent to a device associated with one or more system administrators. The alert message may include information associated with the managed device that transmitted the request for the server key share. The alert message may, for example, include an identifier of an enterprise associated with the master encryption key, an address of the managed device that transmitted the request for the server key share, information used to authenticate the request for the server key share, and/or a time of the request for the server key share.

In another aspect of the disclosed system, the remote management server may, in response to receiving a request for the server key share and prior to transmitting the server key share to the requesting managed device, send a request for approval to share the server key share with the requesting managed device. Such a request may, for example, be sent to one or more accounts or devices associated with one or more system administrators. In such an embodiment, the remote management server only shares the server key share with the requesting managed device upon receipt and authentication of a confirmation message from a system administrator indicating that the server key share may be shared by the remote management server with the requesting managed device.

In the context of setting up a newly added managed device, the disclosed system may operate in response to receipt of a request from a remote system administrator to set up the new managed device. Such a request may, for example, be provided by the system administrator logging in remotely to a management console or the like within the remote management server. In response to the request, the disclosed system may reconstruct the existing master encryption key at the remote management system, generate a new managed device key share of the existing master encryption key, wrap the new managed device key share using the server key share, and send the wrapped new managed device share of the master encryption key to the newly added managed device. The managed device may then request and receive the server key share through a secure connection, use the server key share to unwrap the new managed device share, and combine the server key share with the new managed device share to reconstruct the master encryption key.

Thus there is disclosed a new approach to protecting a master encryption key in a distributed computing environment. The disclosed system advantageously allows for starting up managed devices without requiring a system administrator password to obtain the master encryption key for use during in the start-up process. The disclosed system does not require a system administrator to manually enter a password to access the master encryption key, or for the system administrator's password to be stored or cached in an un-secure fashion. Instead, the disclosed system need only maintain a share of the master encryption key at a remote management server, which can only be accessed through a secure communication channel. By allowing "unattended" start-up of managed devices, the disclosed system facilitates high-availability and scalability in distributed computing environments supporting large numbers of devices, while also maintaining the master encryption key with a high degree of security.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Figure 1:
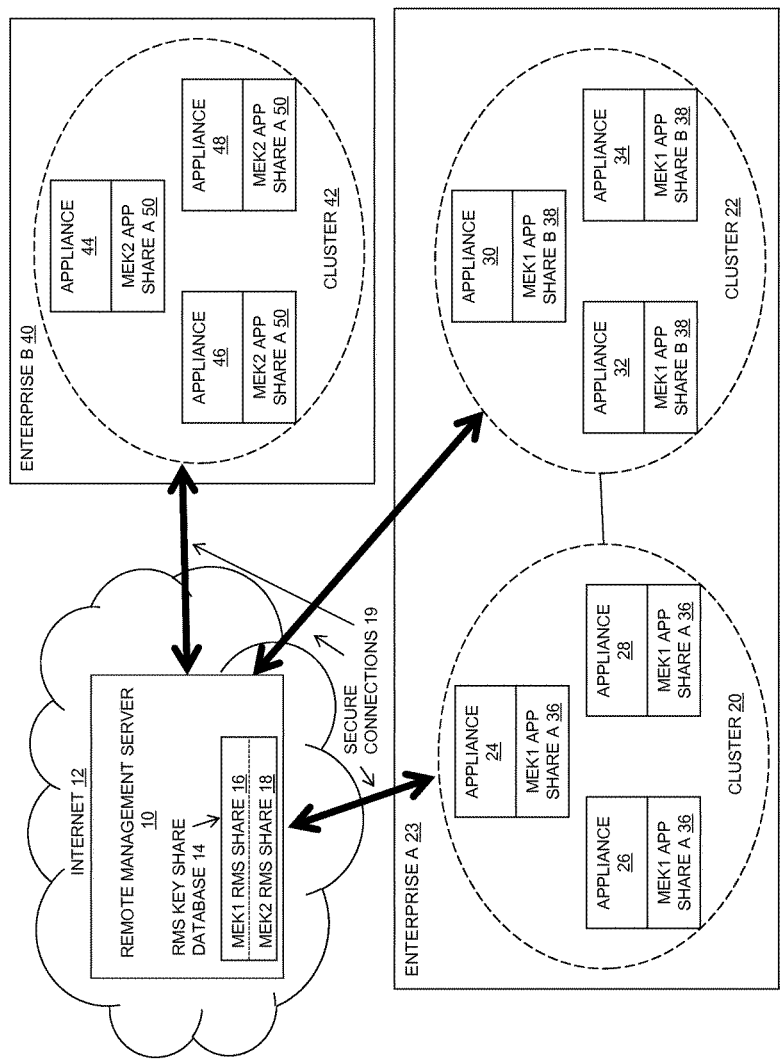
FIG. 1 is a block diagram showing a first example of key share distribution in an illustrative embodiment.
Figure 2:
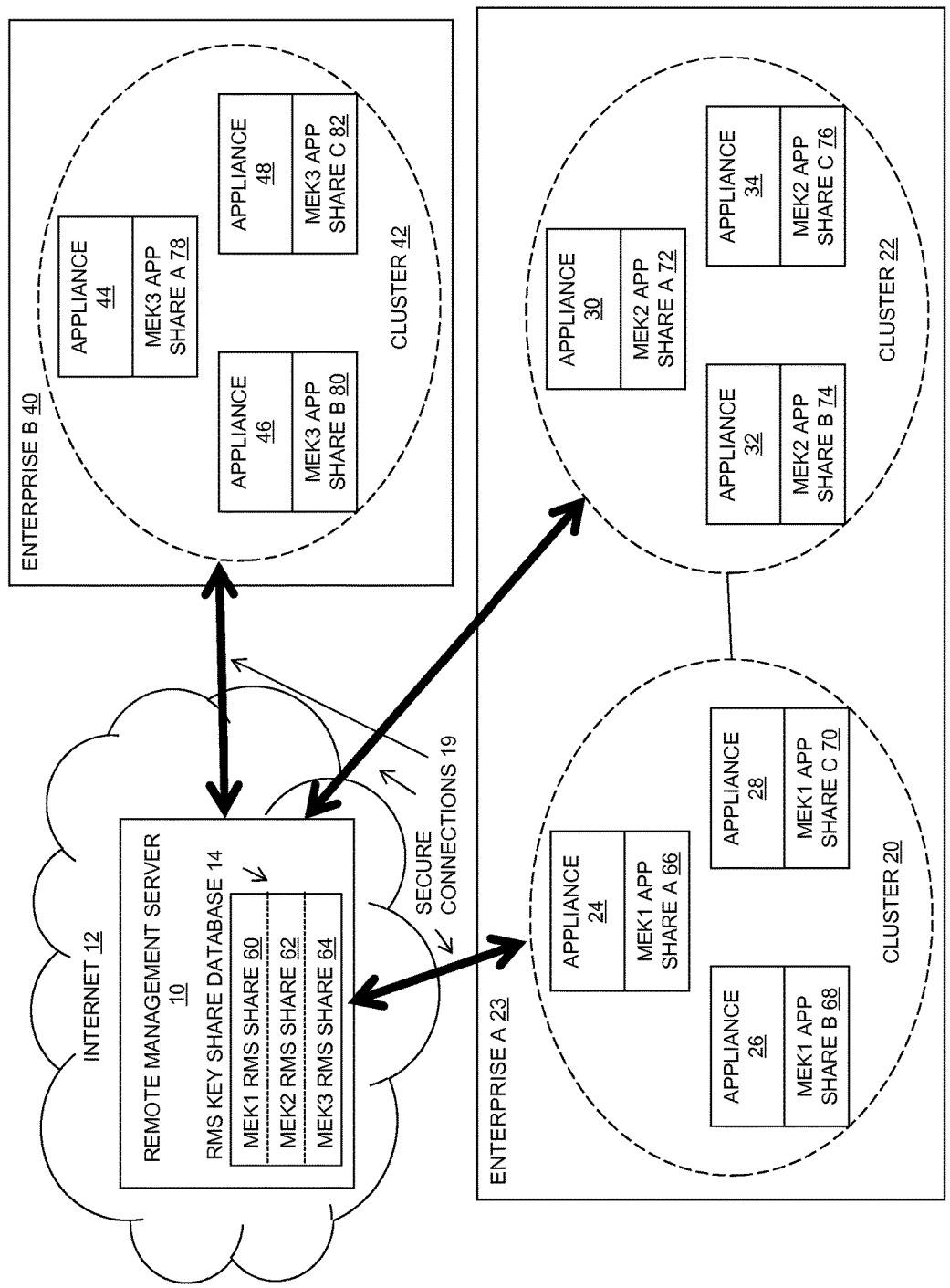
FIG. 2 is a block diagram showing a second example of key share distribution in an illustrative embodiment.
Figure 3:
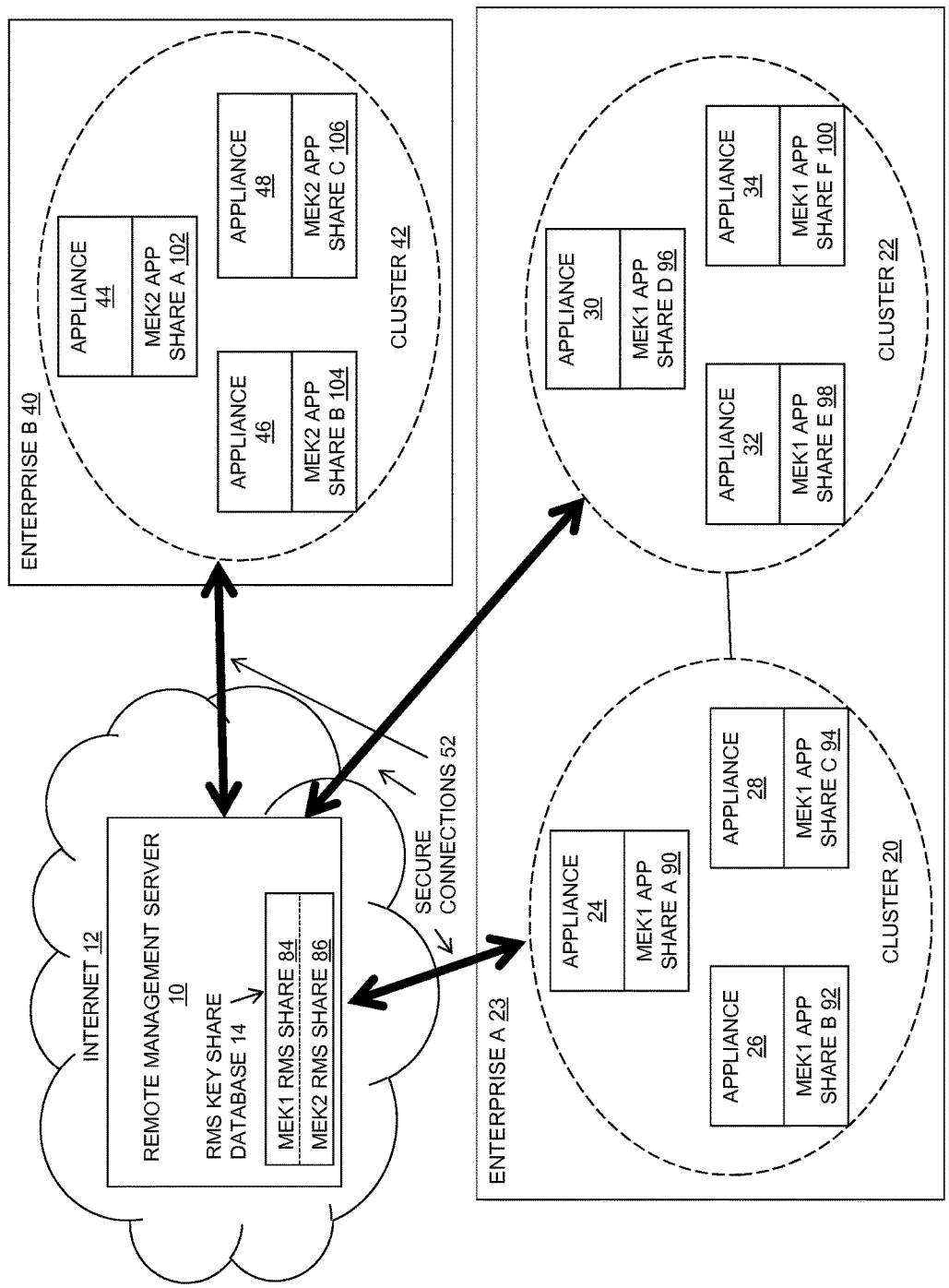
FIG. 3 is a block diagram showing a third example of key share distribution in an illustrative embodiment.
Figure 4:
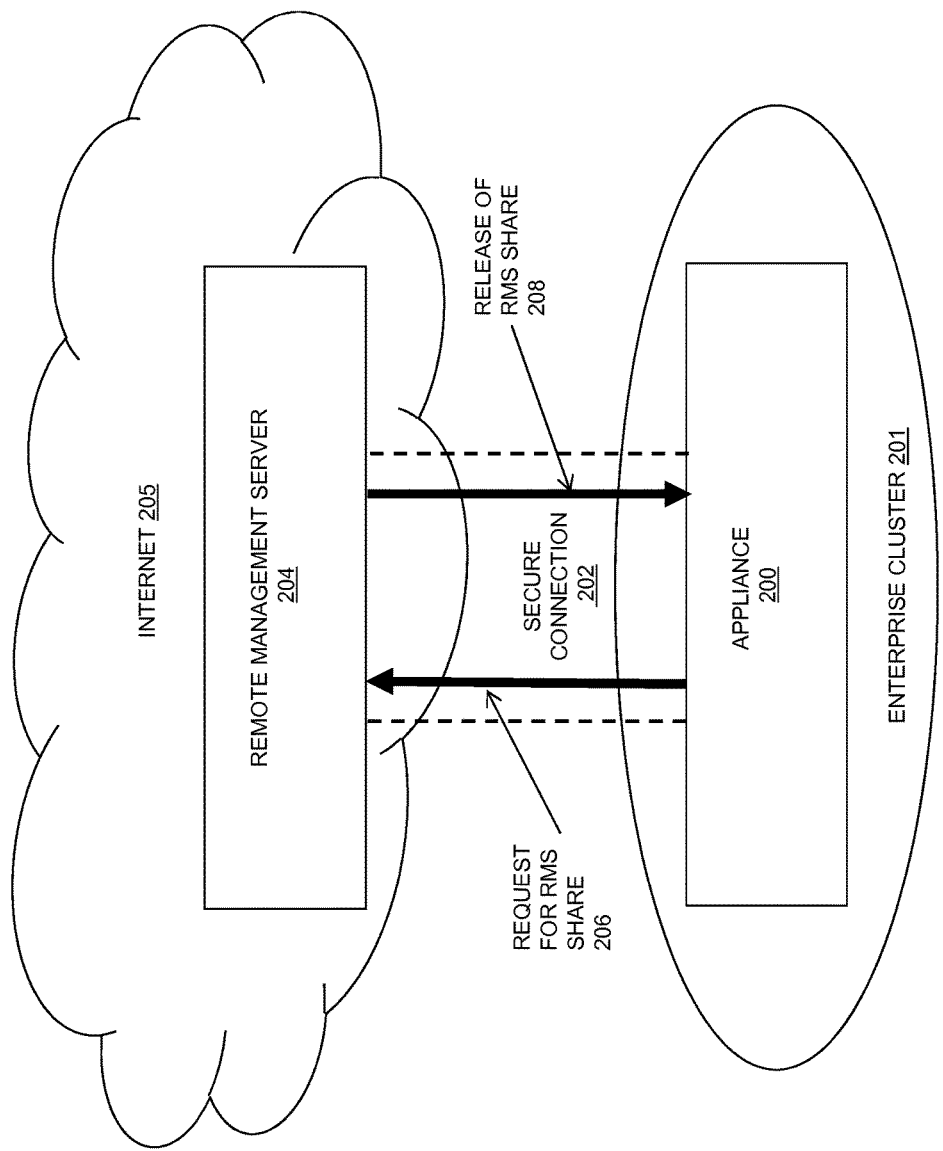
FIG. 4 is a block diagram showing a first example of reconstructing a master encryption key in an illustrative embodiment.

FIGS. 1, 2 and 3 are block diagrams showing examples of key share distribution that may be performed by the disclosed system. As shown in FIGS. 1, 2, and 3, a Remote Management Server 10 is located on an unsecured communication network, shown as the Internet 12, and is communicably connected to a number of appliance clusters belonging to one or more business enterprises. Specifically, the Remote Management Server 10 is connected via secure communication connections 19 to appliances belonging to or under control of Enterprise A 23 and Enterprise B 40. Enterprise A 23 is shown having a first cluster of appliances Cluster 20 and a second cluster of appliances Cluster 22. Cluster 20 includes Appliance 24, Appliance 26 and Appliance 28, and Cluster 22 includes Appliance 30, Appliance 32 and Appliance 34. Enterprise B is shown having a single cluster of appliances Cluster 42. Cluster 42 includes Appliance 44, Appliance 46 and Appliance 48.

Enterprise A 23 and Enterprise B 40 may be any specific type of business organization that uses or controls computing resources and/or data. For example Enterprise A 23 and/or Enterprise B 40 may be a company or corporation, or any other specific type of business organization, or a governmental agency or department.

Alternatively, in an embodiment provided in a cloud computing environment, Enterprise A 23 and/or Enterprise B 40 may each be embodied as individual tenants within a multitenant software architecture. In such an embodiment, Enterprise A 23 and Enterprise B 40 may each be made up of a separate group of one or more users that use one or more shared applications or services. Further in such an embodiment, data isolation is provided for Enterprise A 23 and Enterprise B 40, such that Enterprise A 23 and Enterprise B 40 are each provided their own isolated set of data when using the shared application or service.

The Clusters 20, 22 and 42 shown in FIGS. 1, 2 and 3 are located on one or more networks that are secure and private to their respective enterprises. For example each of the clusters for a given enterprise may be connected to an intranet belonging to that enterprise, and separated from the Internet 12 by a network security system such as a firewall or the like. Clusters 20, 22 and/or 42 may each be any specific type of loosely or tightly connected set of appliances that work together and may be viewed and/or managed as a single system. For example, the appliances within each of Clusters 20, 22 and/or 42 may be connected to each other through a respective local area network ("LAN") or the like, and operate together to jointly provide one or more services with high performance (e.g. by performing load balancing across different appliances), and/or high availability (e.g. by performing failover as needed across redundant appliances).

Each of the appliances shown in FIGS. 1, 2 and 3 may, for example, include or consist of a hardware device or computer having integrated software or firmware, or may include or consist of a software appliance or virtual appliance running on a virtual machine supported by a virtual operating platform such as a hypervisor. Each appliance operates to provide one or more resources and/or related services to users within Enterprise A 23 and/or Enterprise B 40, and/or to customers of Enterprise A 23 and/or Enterprise B 40. For example, in one embodiment, the appliances may consist of or include security server devices and/or software. In such an embodiment, the appliances provide security services such as single sign-on to enterprise resources to enterprise users and/or enterprise customers. During operation of the components shown in FIG. 1, a master encryption key is generated for each enterprise, for example by the Remote Management Server 10. Accordingly, a first master encryption key (referred to as "MEK1") is generated for Enterprise A 23, and a second master encryption key (referred to as "MEK2") is generated for Enterprise B 40. The master encryption keys may be generated using any specific technique for generating cryptographic keys, such as using a random number generator, pseudorandom number generator, or any other appropriate technique.

After each master encryption key generated, it is split into key shares, for example by Remote Management Server 10. The disclosed system may be embodied such that master encryption keys are split using a (k, n) threshold scheme in which a given master encryption key (MEK) is split into n key shares $MEK_1, \ldots MEK_n$ such that (i) possession of any k or more key shares is necessary to reconstruct the master encryption key, and (ii) the master encryption key cannot by determined based on k−1 or fewer key shares. An example of such a threshold scheme is described in "How to Share a Secret" by Adi Shamir, Communications of the ACM, November 1979, Volume 22, Number 11, all disclosures of which are hereby included herein by reference. Alternatively, the disclosed system may be embodied such that each master encryption key is split such that one of the resulting key shares is a special key share that must be part of any combination of shares used to reconstruct that master encryption key.

Further during operation of the configuration shown in FIG. 1, the shares of each master encryption key are distributed such that at least one share (the "RMS key share") is stored in the Remote Management Server 10, and other shares (the "appliance key shares") are distributed among the appliances. Specifically, one appliance key share is distributed to each cluster and stored on the appliances within that cluster. Accordingly, the master encryption key MEK1 for Enterprise A 23 is split into shares, and the resulting shares distributed such that MEK1 RMS Share 16 is stored in the RMS Key Share Database 14, a copy of MEK1 Appliance Share A 36 is stored in each of the appliances 24, 26 and 28 in Cluster 20, and a copy of MEK1 Appliance Share B 38 is stored in each of the appliances 30, 32 and 34 in Cluster 22. Similarly, the master encryption key MEK2 for Enterprise B 40 is split, and the resulting shares are distributed such that MEK2 RMS Share 18 is stored in the RMS Key Share Database 14, and a copy of MEK2 Appliance Share A 50 is stored in each of the appliances 44, 46 and 48 in Cluster 42.

FIG. 2 is a block diagram showing a second example of key share distribution in an illustrative embodiment. In the example shown in FIG. 2, a master encryption key is generated for each cluster of appliances. Accordingly, a first master encryption key (referred to as "MEK1") is generated for Cluster 20, a second master encryption key (referred to as "MEK2") is generated for Cluster 22, and a third master encryption key (referred to as "MEK3") is generated for cluster 42. Each master encryption key is split and the resulting shares are distributed such that at least one share (the "RMS share") is stored in the Remote Management Server 10, and the appliance shares are distributed among the appliances such that each appliance in a given cluster receives and stores its own appliance key share. Specifically, master encryption key MEK1 for Cluster 20 is split, and the resulting key shares distributed such that MEK1 RMS Share 60 is stored in the RMS Key Share Database 14, MEK1 Appliance Share A 66 is stored in Appliance 24, MEK1 Appliance Share B 68 is stored in Appliance 26 and MEK1 Appliance Share C 70 is stored in Appliance 28. The master encryption key MEK2 for Cluster 22 is also split, and the resulting key shares distributed such that MEK2 RMS Share 62 is stored in the RMS Key Share Database 14, MEK2 Appliance Share A 72 is stored in Appliance 30, MEK2 Appliance Share B 74 is stored in Appliance 32 and MEK2 Appliance Share C 76 is stored in Appliance 34. Similarly, the master encryption key MEK3 for Cluster 42 is split, and the resulting key shares distributed such that MEK3 RMS Share 64 is stored in the RMS Key Share Database 14, MEK3 Appliance Share A 78 is stored in Appliance 44, MEK3 Appliance Share B 80 is stored in Appliance 46, and MEK3 Appliance Share C 82 is stored in Appliance 48.

FIG. 3 is a block diagram showing a third example of key share distribution in an illustrative embodiment. In the example shown in FIG. 3, a master encryption key is generated for each business enterprise. Accordingly, a first master encryption key (referred to as "MEK1") is generated for Enterprise A 23, and a second master encryption key (referred to as "MEK2") is generated for Enterprise B 40. The shares of each master encryption key are distributed such that at least one key share (the "RMS share") is stored in the Remote Management Server 10, and the appliance key shares are distributed among the appliances such that each one of the appliances in a given enterprise receives and stores its own appliance key share, regardless of which cluster the appliance is located in. Specifically, master encryption key MEK1 for Enterprise A 23 is split, and the resulting shares are distributed such that MEK1 RMS Share 84 is stored in the RMS Key Share Database 14, MEK1 Appliance Share A 90 is stored in Appliance 24, MEK1 Appliance Share B 92 is stored in Appliance 26, MEK1 Appliance Share C 94 is stored in Appliance 28, MEK1 Appliance Share D 96 is stored in Appliance 30, MEK1 Appliance Share E 98 is stored in Appliance 32, and MEK1 Appliance Share F 100 is stored in Appliance 34. The master encryption key MEK2 for Enterprise B 40 is split, and the resulting shares distributed such that MEK2 RMS Share 86 is stored in the RMS Key Share Database 14, MEK2 Appliance Share A 102 is stored in Appliance 44, MEK2 Appliance Share B 104 is stored in Appliance 46 and MEK2 Appliance Share C 106 is stored in Appliance 34.

FIGS. 4-8 show examples of master encryption key reconstruction in an illustrative embodiment. As shown in FIGS. 4-8, the disclosed system advantageously provides the ability to startup appliances automatically without requiring administrator attendance. The disclosed system leverages the availability of network connectivity between an Appliance 200 located on Enterprise Cluster 201, and a Remote Management Server 204 located on the Internet 205. Through this network connectivity, at the time Appliance 200 is started up, the disclosed system establishes Secure Connection 202 between the Appliance 200 and the Remote Management Server 204. For example, at start up the Appliance 200 may establish Secure Connection 202 between the Appliance 200 and the Remote Management Server 204. The Secure Connection 202 may be provided using a tunneling protocol that includes encryption and authentication, based on transport layer network security such as Internet Protocol Security (IPSec), or Virtual Private Network (VPN) through Secure Sockets Layer (SSL). At 206 the Appliance 200 requests the RMS share of the master encryption key from the Remote Management Server 204. The request is authenticated at the Remote Management Server 204, to ensure that the Appliance 200 issued the request. Such authentication may, for example, be enforced using client certificates associated with the appliances. The Remote Management Server 204 may only release the RMS share to an authenticated and authorized appliance.

Transport layer key material used to support data privacy, data integrity and/or client authentication with regard to communications between the Appliance 200 and the Remote Management Server 204 may be protected using file system and network-based access-controls. For example, various specific encryption techniques, including Trusted Platform Module (TPM)-based disk encryption tools, and/or non-TPM based disk encryption tools, may be used to protect transport layer key material, and/or each appliance's master encryption key share. For example, disk encryption tools such as Windows® BitLocker with USB Key mode, and/or those provided for various server platforms (e.g. Linux, Windows®, etc.), may be used to protect transport layer key material and/or to protect an appliance's master encryption key share.

If the request is authenticated as being issued by the Appliance 200, Remote Management Server 204 determines whether the Appliance 200 is authorized to obtain a copy of the RMS share of the master encryption key. The authorization performed by the Remote Management Server 204 may, for example, be based on one or more access control rules. If Appliance 200 is authorized to receive the RMS share of the master encryption key, then at 208 the Remote Management Server 204 releases the RMS share by transmitting the RMS share to the Appliance 200 through the Secure Connection 202. The Appliance 200 combines the received RMS share with its local appliance share to reconstruct the master encryption key, and uses the reconstructed master encryption key to perform local data encryption and/or key wrapping during the startup process.

Figure 5:
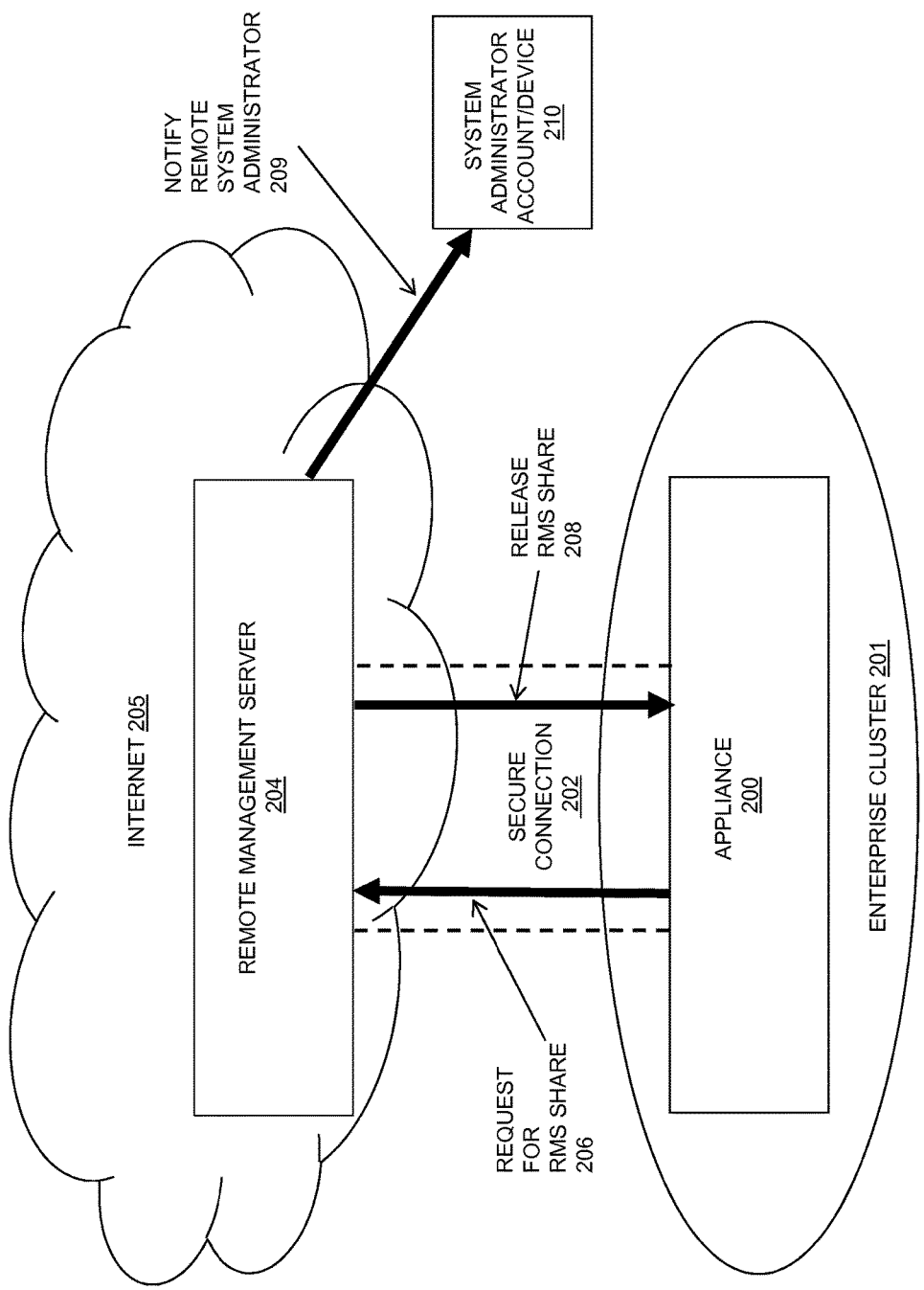
FIG. 5 is a block diagram showing a second example of reconstructing a master encryption key in an illustrative embodiment.

FIG. 5 is a block diagram showing an example of the disclosed system reconstructing a master encryption key at appliance startup without requiring administrator attendance, and additionally providing an "alert" notification message to a system administrator user for risk mitigation. As shown in FIG. 5, following release of the RMS share at 208, at 209 the Remote Management Server 204 transmits an alert notification message to an account (e.g. electronic mail account) or device (e.g. mobile device such as a mobile phone, personal digital assistant, etc.) associated with one or more previously registered system administrators. The alert notification message may, for example, consist of a push message, text message, instant message, electronic mail message, or any other specific type of message, and may include information about the appliance that requested the RMS share. Information about Appliance 200 contained in the alert notification message may, for example, include an identifier of an enterprise to which the Appliance 200 belongs, the Internet Protocol (IP) address of the Appliance 200, the client certificate or credential identifier used for authentication of the Appliance 200, a time of the request for the RMS share, and/or other information or metadata.

Figure 6:
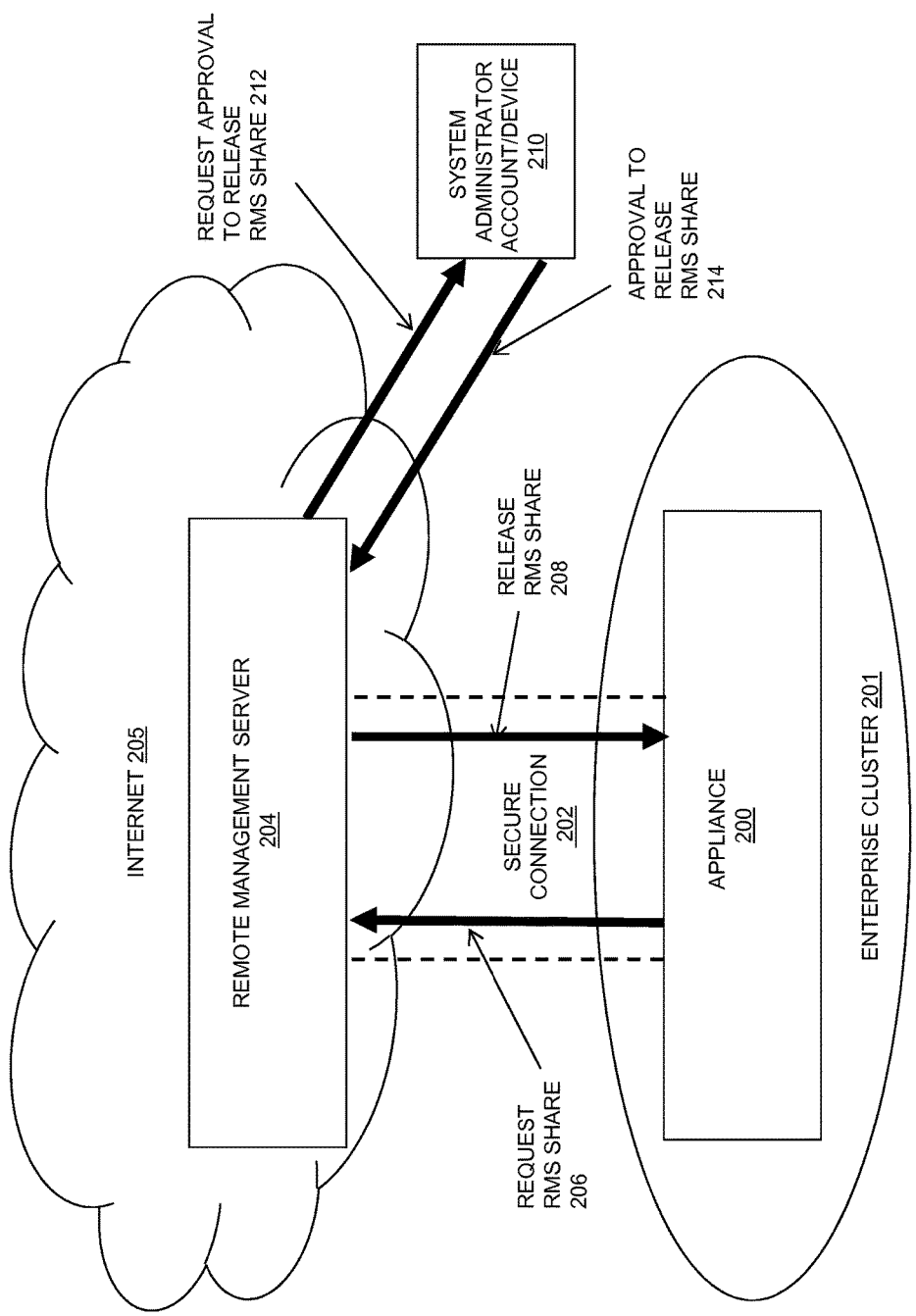
FIG. 6 is a block diagram showing a third example of reconstructing a master encryption key in an illustrative embodiment.

FIG. 6 is a block diagram showing an example of the disclosed system reconstructing a master encryption key at appliance startup without requiring administrator attendance, responsive to receipt of an approval message from a remote administrator user indicating that the Remote Management Server 204 may release the RMS share to the Appliance 200. As shown in FIG. 6, in response to receipt of the request from the Appliance 200, and before releasing the RMS share, at 212 the Remote Management Server 204 transmits a request to a System Administrator Account/Device 210 for approval to release the RMS share to the Appliance 200. The request may, for example, consist of a push message, text message, instant message, electronic mail message, or any other specific type of message, and may include information about the appliance that requested the RMS share. Information contained in the Request 206 about the Appliance 200 that requested the RMS share may, for example, include an identifier of an enterprise to which the Appliance 200 belongs, the Internet Protocol (IP) address of the Appliance 200, the client certificate or credential identifier used for authentication of the Appliance 200, a time of the request for the RMS share, and/or other data or metadata. At 214, an approval to release the RMS share is transmitted by the administrator user from the System Administrator Account/Device 210, and received by the Remote Management Server 204. In the embodiment of FIG. 6, the Remote Management Server 204 only releases the RMS share to the Appliance 200 upon receipt of an authenticated approval message indicating that an administrator user has approved the release of the RMS share to the Appliance 200 from the System Administrator Account/Device 210.

Figure 7:
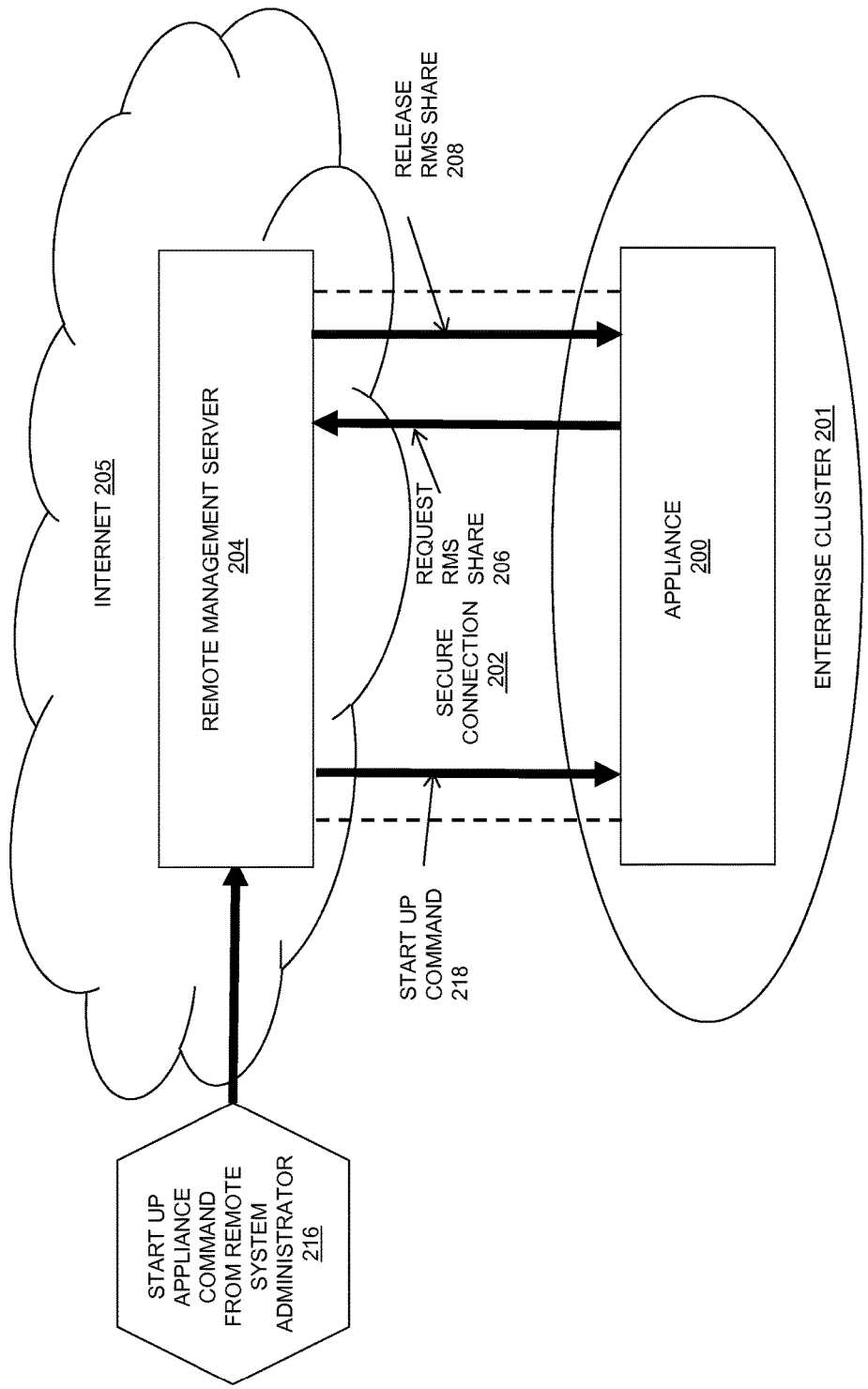
FIG. 7 is a block diagram showing an example of reconstructing a master encryption key in response to a startup appliance command in an illustrative embodiment.

FIG. 7 is a block diagram showing an example of the disclosed system reconstructing a master encryption key at appliance startup, in which the appliance is started up manually by a remote administrator user. In the example of FIG. 7, an remote administrator user signs in remotely to a management console of the Remote Management Server 204, and at 216 issues a startup appliance command to the Remote Management Server 204 through the management console. In response to receipt of the startup appliance command, at 218 the Remote Management Server 204 transmits a startup command to the Appliance 200. The startup command from the Remote Management Server 204 causes the Appliance 200 to establish the Secure Connection 202, issue the request for the RMS share, and then reconstruct the master encryption key using the received RMS share in combination with the appliance share of the Appliance 200.

Figure 8:
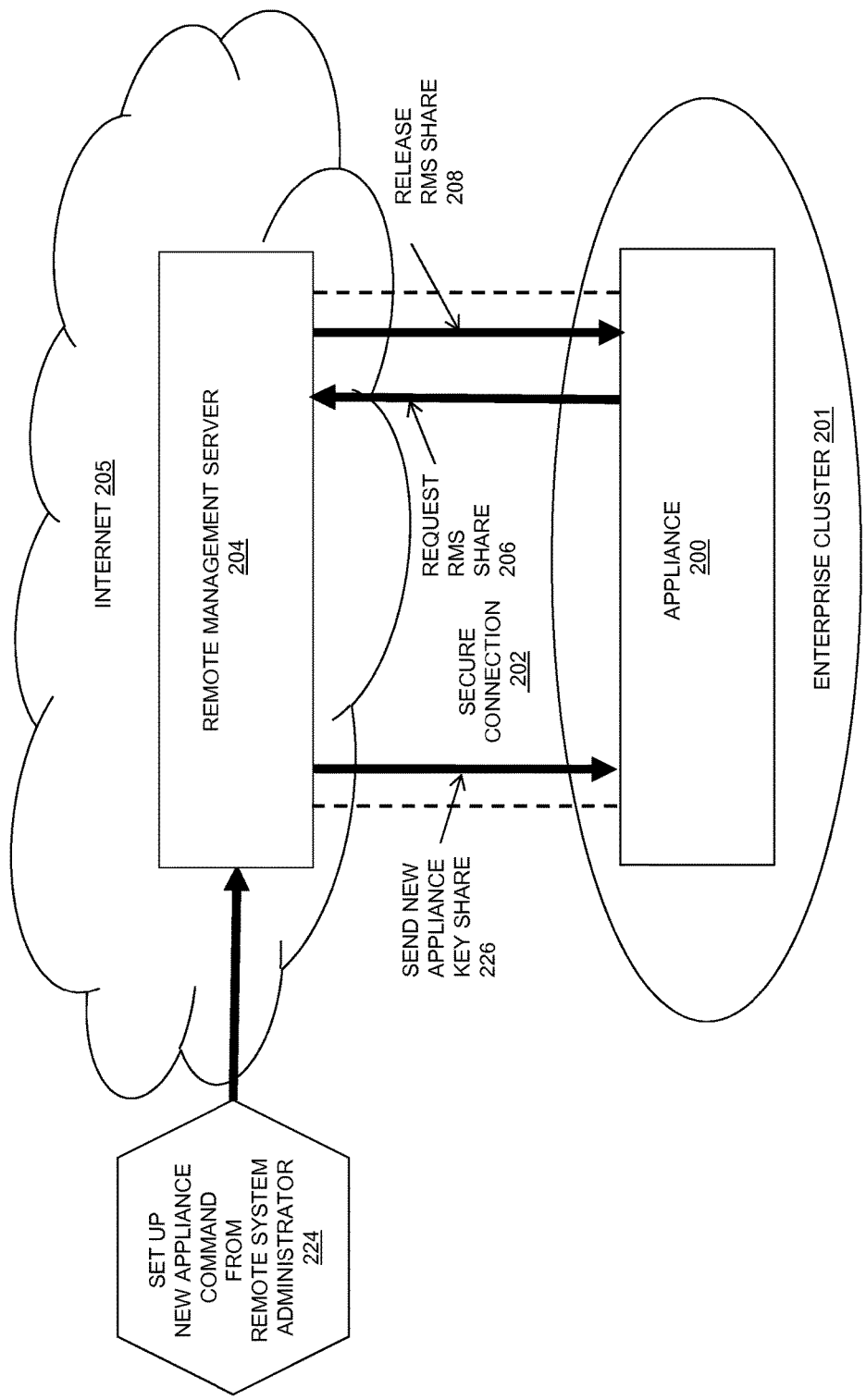
FIG. 8 is a block diagram showing an example of reconstructing a master encryption key in response to a set up appliance command in an illustrative embodiment.

FIG. 8 is a block diagram showing an example of the disclosed system reconstructing a master encryption key when setting up a new appliance in an illustrative embodiment. In the example of FIG. 8, the Remote Management Server 204 receives a set up new appliance command 224 from a remote system administrator user, who has for example logged in remotely to a management console of the Remote Management Server 204. The Remote Management Server 204 then reconstructs the existing master encryption key at the remote management server, generates a new appliance key share from the existing master encryption key, and wraps the new appliance key share using the RMS share.

An existing master encryption key may be reconstructed by the Remote Management Server 204 in different ways depending on the specific embodiment or configuration of the disclosed system. For example, in one embodiment, the Remote Management Server 204 may operate to obtain one or more appliance shares from one or more of the existing appliances to which appliance shares were previously distributed. In such an embodiment, the Remote Management Server 204 uses the secure connection(s) with those appliance(s) to request and receive the number of appliance shares needed to combine with the RMS share to reconstruct the master encryption key. The Remote Management Server 204 then combines the RMS share with the received appliance share(s) to reconstruct the master encryption key, and derives all the coefficients of the polynomial used to split the master encryption key. The Remote Management Server 204 then applies the derived polynomial to split the reconstructed master encryption key in order to produce the new appliance share.

In an alternative embodiment, appliance shares are distributed such that a single appliance share is shared among all the appliances in a cluster (e.g. FIG. 1), the Remote Management Server 204 does not need to generate a new appliance share for a newly added appliance. Instead, the Remote Management Server 204 may obtain a copy of the appliance share for the cluster to which the new appliance is being added from one of the existing appliances in that cluster, and then send that appliance share to the new appliance. In another alternative embodiment, the appliance share for the cluster to which the new appliance is being added may be copied directly from an another appliance in the cluster to the new appliance.

In still another alternative embodiment, the master encryption key may be split in a way that allows an administrator password-based share to be subsequently derived from the administrator's password, such that the administrator password-based share can then be combined with one or more of the other key shares to reconstruct the master encryption key. In such an embodiment, the Remote Management Server 204 obtains the administrator password (e.g. from the remote system administrator who issued the set up new appliance command 224), derives the administrator password-based key share from the administrator password, and combines the administrator password-based key share with the RMS share to reconstruct the existing master encryption key. In the process of reconstructing the master encryption key using the administrator password-based key share and the RMS share, the remote management system derives all the coefficients of the polynomial used to split the master encryption key, and then applies the derived polynomial to split the reconstructed master encryption key in order to produce the new appliance share.

And in another alternative embodiment, the disclosed system may operate to store one of the generated key shares offline. In such an embodiment, the offline key share may be used in the same way as the administrator password-based key share, i.e. combined with the RMS share to reconstruct the master encryption key and to derive the coefficients of the polynomial used to split the master encryption key, so that the derived polynomial can be applied to split the reconstructed master encryption key in order to produce the new appliance share.

The key-wrapping performed by the Remote Management Server 204 to wrap the new appliance share using the RMS share may be accomplished using any specific type of key wrapping technique. Appropriate key wrapping techniques may, for example, include symmetric encryption algorithms. Accordingly, after the new appliance share is wrapped using the RMS share, the RMS share is subsequently required in order to unwrap the new appliance share at the new appliance before the new appliance share can be used by the new appliance (e.g. to reconstruct the master encryption key). The disclosed system may alternatively be embodied such that the new appliance share is sent to the new appliance without being wrapped.

At 226 the Remote Management Server 204 sends the new appliance key share, wrapped using the RMS share, to the Appliance 200. Upon receipt of the new appliance key share, at 206 the Appliance 200 requests the RMS share. At 208, the Remote Management Server 204 then releases the RMS Share to the Appliance 200. The Appliance 200 can then unwrap the new appliance key share using the received RMS share, and then combine the RMS share with the new appliance share to reconstruct the master encryption key for use during initial set up. In this way the disclosed system facilitates set up of a new appliance and assigning a new master encryption key share to the new appliance without revoking any of the previously distributed master encryption key shares.

Figure 9:
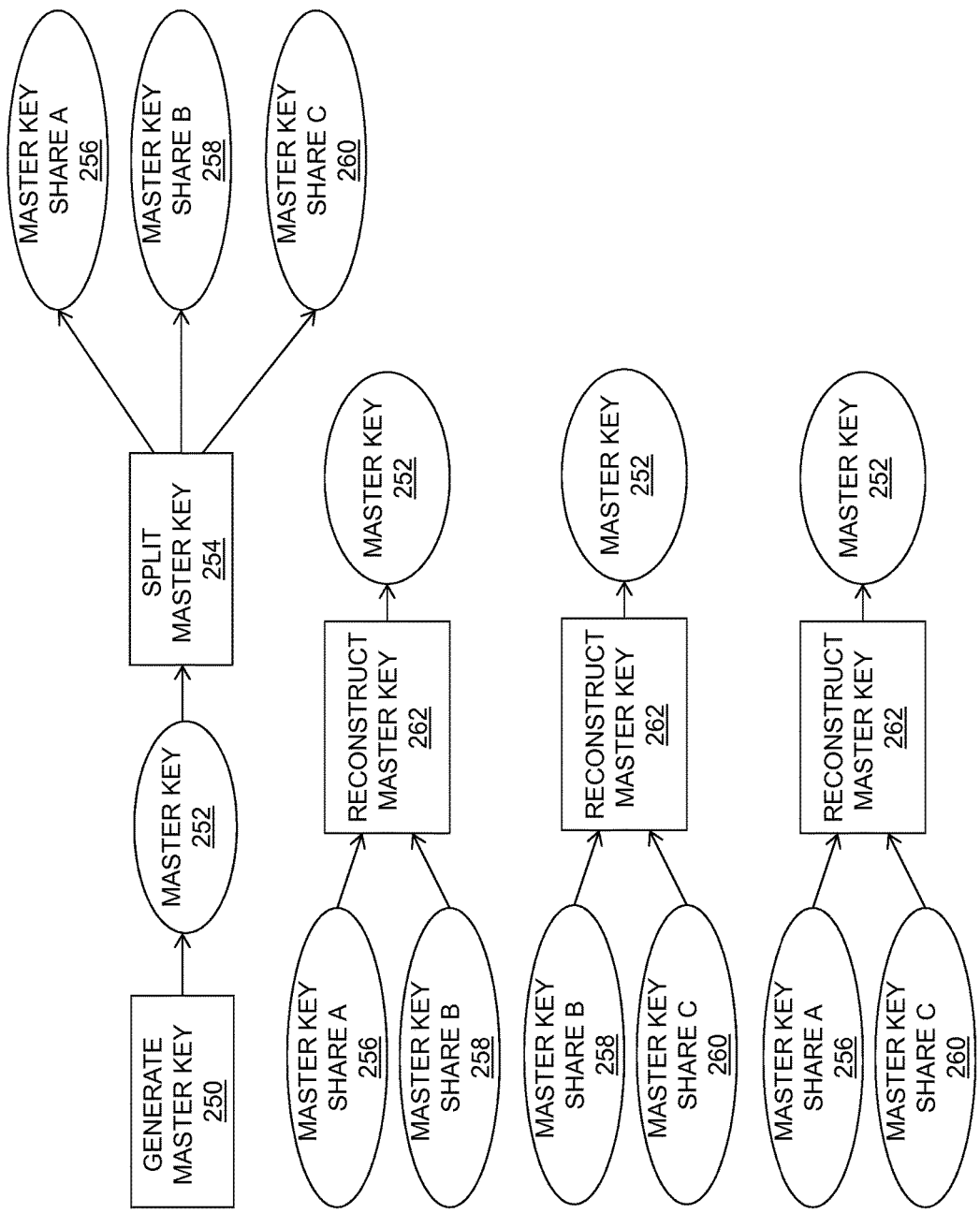
FIG. 9 is a block diagram illustrating key splitting using a threshold secret splitting technique.

FIG. 9 is a block diagram illustrating key splitting using a threshold secret splitting technique in an illustrative embodiment. At 250 the disclosed system generates a master encryption key 252. At 254, the master encryption key 252 is split into the following shares: master key share A 256, master key share B 258, and master key share C 260. In the threshold secret splitting technique of FIG. 9, any combination of the shares may be used to reconstruct the master key 252. Accordingly, a step 262 of reconstructing the master encryption key 252 may take as inputs any of the following share combinations to successfully reconstruct the master encryption key 252:

i) master key share A 256 and master key share B 258, ii) master key share B 258 and master key share C 260, or iii) master key share A 256 and master key share C 260.

Figure 10:
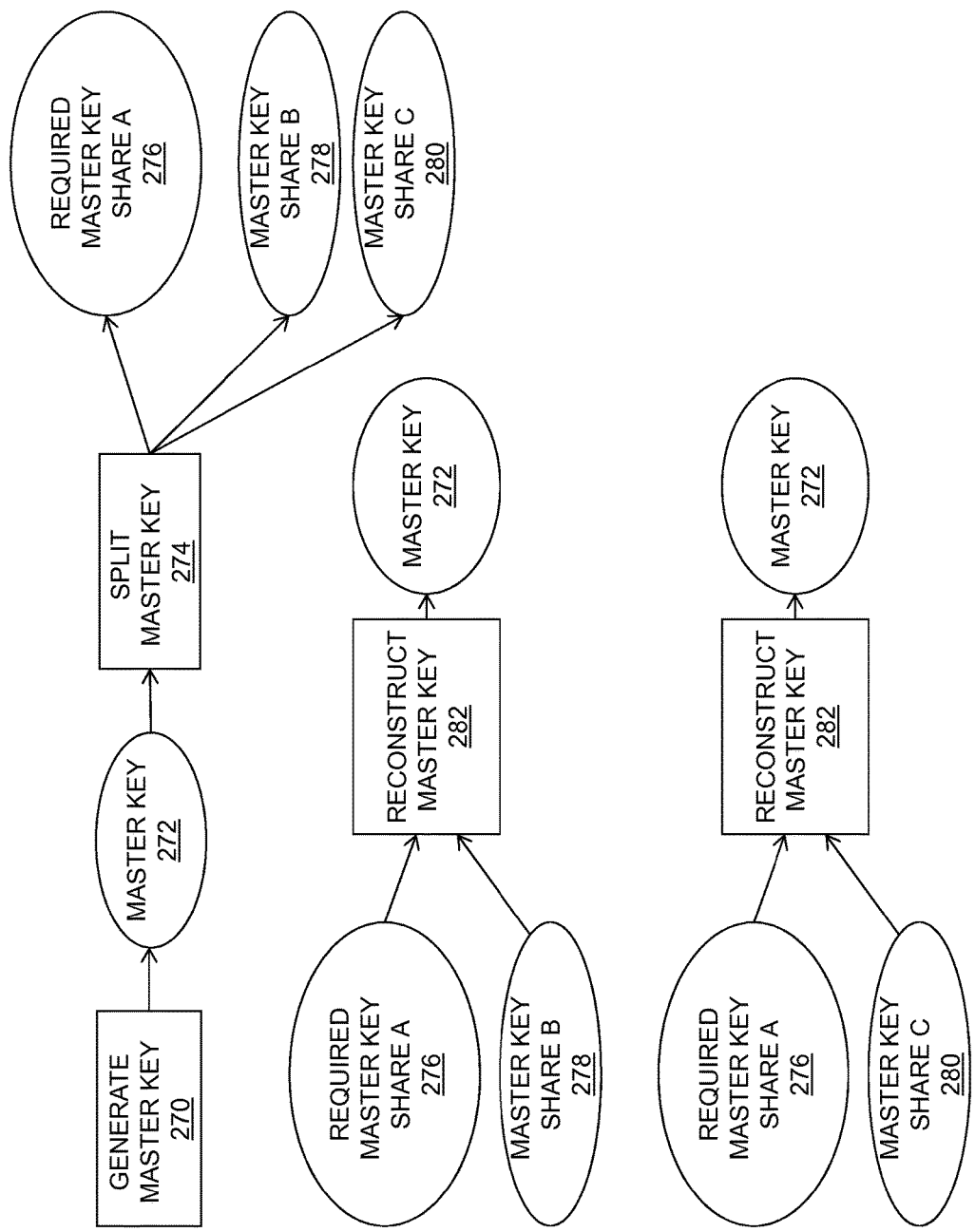
FIG. 10 is a block diagram illustrating key splitting using secret splitting technique that produces a required key share.

FIG. 10 is a block diagram illustrating key splitting using a secret splitting technique that produces a required key share in an illustrative embodiment. At 270 the disclosed system generates a master encryption key 272. At 274, the master encryption key 272 is split into the following shares:

required master key share A 276, master key share B 278, and master key share C 280. In the secret splitting technique shown in FIG. 10, only combinations of shares including required master key share A 276 may be used to reconstruct the master key 272. Accordingly, a step 282 of reconstructing the master encryption key 272 may only take as the following share combinations to successfully reconstruct the master encryption key 272:

i) required master key share A 276 and master key share B 278, or ii) required master key share A 276 and master key share C 280.

In one embodiment, the Required Master Key Share A 276 may be generated by wrapping all other key shares (e.g. Master Key Share B 278 and Master Key Share C 280) using the Required Key Share A 276 prior to distributing the other key shares. Accordingly, Required Master Key Share A 276 must be acquired to accomplish any reconstruction of Master Key 272, since Master Key Share B 278 and Master Key Share C 280 must be unwrapped using Required Master Key Share A 276 prior to being combined with any other key share to reconstruct the Master Key 272.

As mentioned above with reference to FIG. 8, the disclosed system may be embodied such that the master encryption key may be split at 254 in FIG. 9 or 274 in FIG. 10 in a way that allows an administrator password-based share to be subsequently derived from the administrator's password. In such an embodiment, the administrator password is an input to the key splitting function, i.e. to either 254 in FIG. 9 or 274 in FIG. 10. With reference to the embodiment shown in FIG. 9, the administrator password-based key share can then be combined with any of the other key shares to reconstruct the master encryption key. With reference to the embodiment shown in FIG. 10, the administrator password-based share can be combined with Required Master Key Share A 276 to reconstruct the master encryption key.

While the examples of FIGS. 9 and 10 show embodiments in which the threshold number of key shares required to reconstruct the master encryption key is equal to two, the disclosed system is not limited to such embodiments. Accordingly, those skilled in the art will recognize that the disclosed system may alternatively be embodied such that more than two key share are required to reconstruct the master encryption key.

Figure 11:
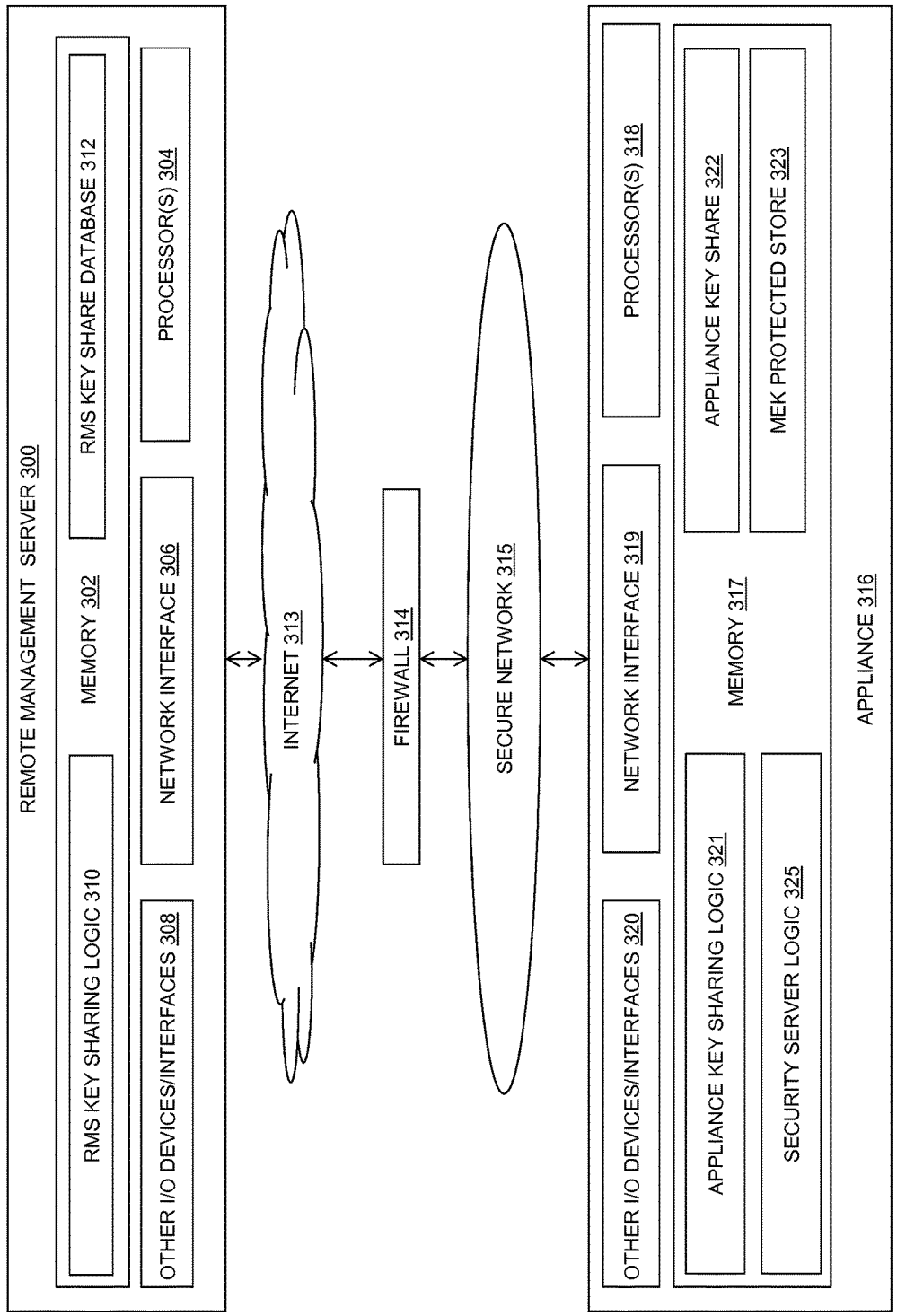
FIG. 11 is a block diagram showing a remote management system and an appliance in an illustrative embodiment.

FIG. 11 is a block diagram showing an example of a Remote Management Server 300 and an Appliance 316 in an illustrative embodiment. As shown in FIG. 11, the Remote Management Server 300 includes Memory 302, Processor(s) 304, Network Interface 306 and Other I/O Devices or Interfaces 308. The Memory 302 includes RMS Key Sharing Logic 310 and an RMS Key Share Database 312. The Network Interface 306 is coupled to the Internet 313. The RMS Key Sharing Logic 310 may, for example, be made up of program code executable on Processor(s) 304. In an embodiment provided in a cloud computing environment, Remote Management Server 300 may, for example, be embodied to perform the operations described herein as at least part of providing one or more cloud-based services to one or more tenants (e.g. enterprises) consuming those services within a multi-tenant software architecture.

A Firewall 314 is positioned between the Internet 313 and Secure Network 315. The Appliance 316 is communicably coupled to the Secure Network 315 by way of Network Interface 319. The Appliance 316 is further shown including Processor(s) 318, Other I/O Devices or Interfaces 320, and Memory 317. The Memory 317 is shown including Appliance Key Sharing Logic 321, Appliance Key Share 322, Master Encryption Key Protected Store 323, and Security Server Logic 325. The Appliance Key Sharing Logic 321 and Security Server Logic 325 may, for example, be made up of program code executable on the processor(s) 304.

During operation of the Remote Management Server 300 and Appliance 316 shown in FIG. 11, a master encryption key is generated, for example by the RMS Key Sharing Logic 310. The RMS Key Sharing Logic 310 further operates to split the master encryption key, and to store at least one RMS share in the RMS Key Share Database 312. Alternatively, the Remote Management Server 300 may store its RMS share or shares in a key store, such as a Java™ KeyStore. The RMS Key Sharing Logic 310 distributes appliance key shares to a number of appliances including the Appliance 315. The Appliance 310 stores its received appliance key share as the Appliance Key Share 322 shown in Memory 317. The Appliance 316 may use various specific encryption techniques, including Trusted Platform Module (TPM)-based disk encryption tools, and/or non-TPM based disk encryption tools, to protect Appliance Key Share 322 from unauthorized access. For example, Appliance 316 may use disk encryption tools such as Windows® BitLocker with USB Key mode, and/or those provided for various server platforms (e.g. Linux, Windows®, etc.), to protect Appliance Key Share 322 from unauthorized access.

The contents of the Master Encryption Key Protected Store 323 is encrypted using the master encryption key, e.g. when the Appliance 316 is started up. For example, the Master Encryption Key Protected Store 323 may include user passwords, token seeds, and/or other information that must be encrypted using the master encryption key. In one embodiment, in which the Security Server Logic 325 provides security services such as single sign-on to enterprise resources to enterprise users and/or enterprise customers, the Appliance 316 may maintain a unique encryption key associated with each user, and use that key to encrypt the user's passwords. Such user keys are another example of information that may be stored in the master encryption key protected store 323, i.e. that may be encrypted or wrapped using the master encryption key.

Figure 12:
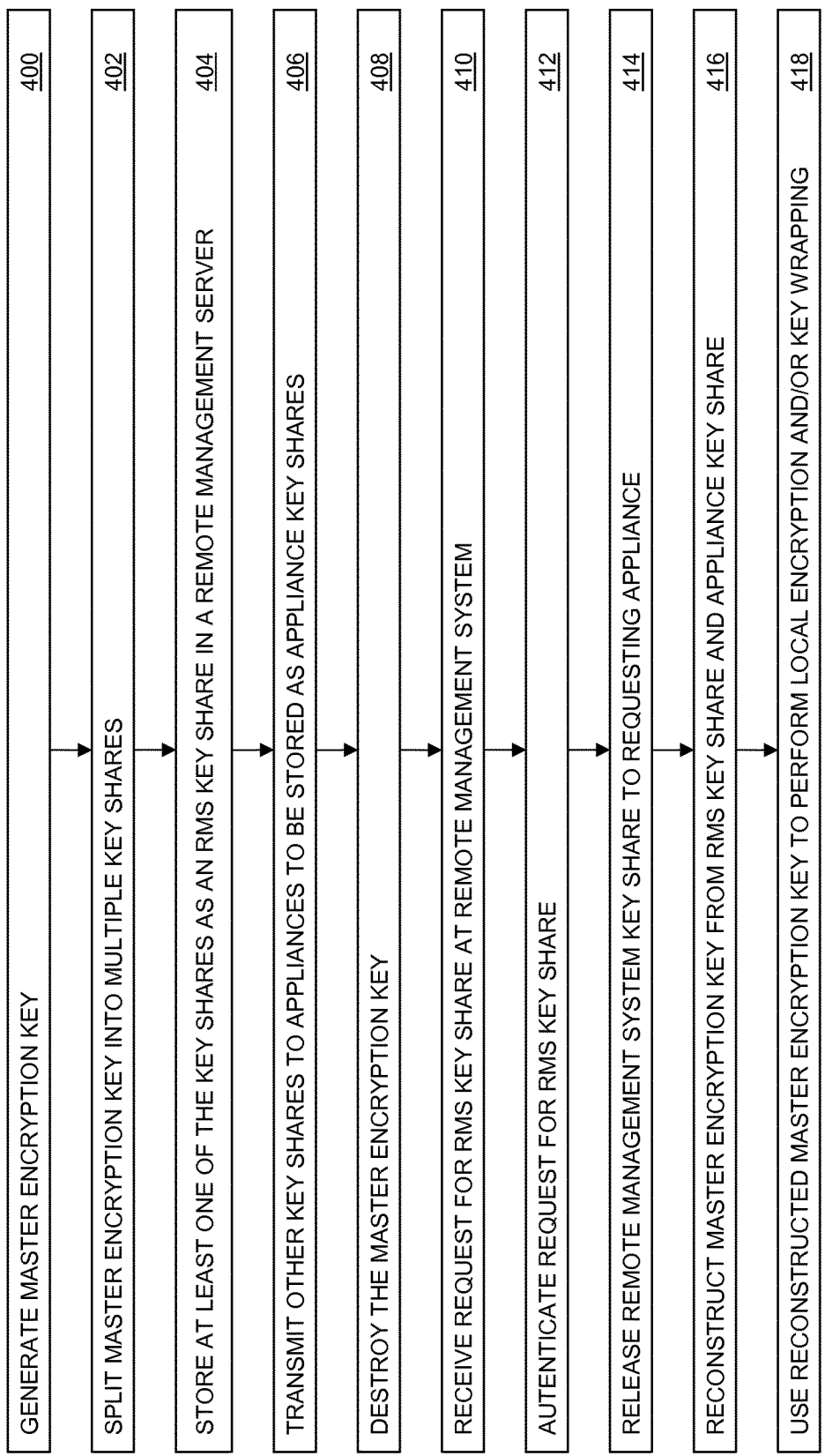
FIG. 12 is a flow chart showing steps performed to protect and reconstruct a master encryption key in an illustrative embodiment.

FIG. 12 is a flow chart showing steps performed to protect and reconstruct a master encryption key in an illustrative embodiment. The steps of FIG. 12 may, for example, be performed by the RMS Key Sharing Logic 310 and Appliance Key Sharing Logic 321 shown in FIG. 11. At step 400 a master encryption key is generated, and then split into multiple shares at step 402. In an embodiment in which an administrator password-based key share may subsequently be derived from the administrator password, the administrator password is obtained and used as an input to the key splitting step 402. One of the key shares is stored as an RMS key share within a remote management server at step 404, and the other key shares are transmitted to appliances at step 406 to be stored as appliance key shares. At step 408, the master encryption key is destroyed. At step 410 the remote management server receives a request for the RMS key share from an appliance. The remote management server authenticates the request for the RMS key share at step 412, and releases the RMS key share to the requesting appliance at step 414. At step 416, the requesting appliance reconstructs the master encryption key using the RMS key share and the appliance key share of the appliance. The appliance then uses the reconstructed master encryption key to perform encryption of local data and/or key wrapping.

Figure 13:
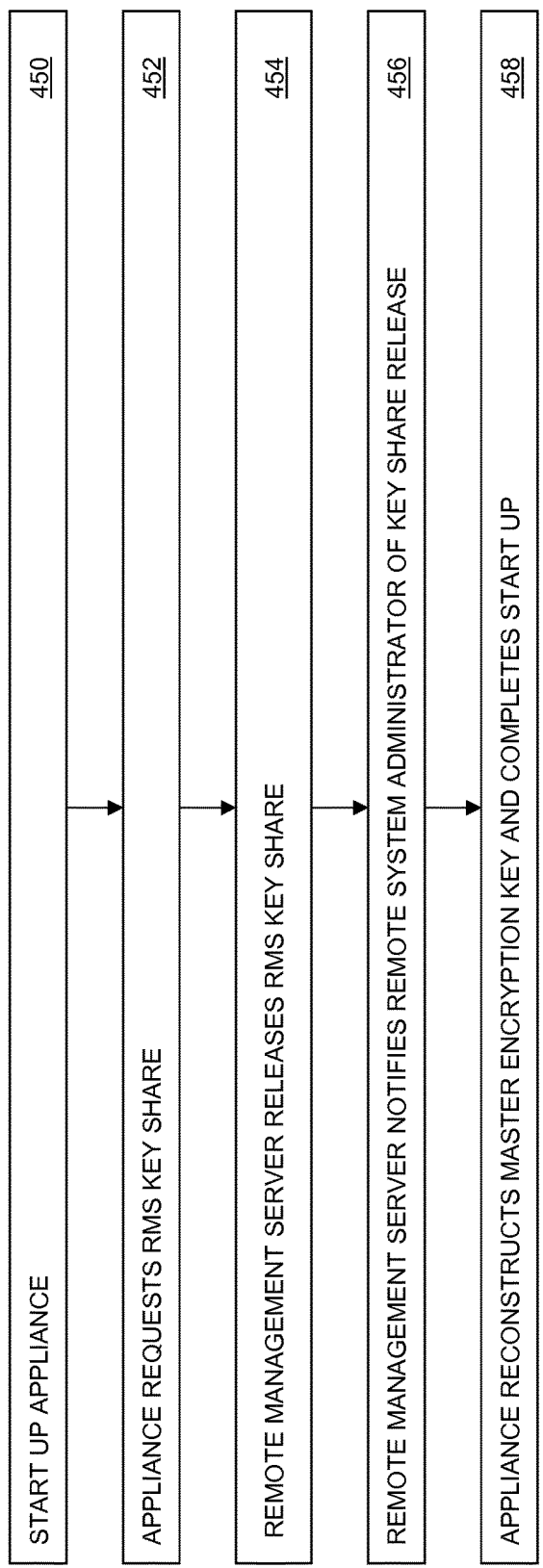
FIG. 13 is a flow chart showing a first example of steps performed to reconstruct a master encryption key to provide unattended start-up of an appliance in an illustrative embodiment.

FIG. 13 is a flow chart showing a first example of steps performed to reconstruct a master encryption key to provide unattended start-up of an appliance in an illustrative embodiment. The steps of FIG. 13 may, for example, be performed by the RMS Key Sharing Logic 310 and Appliance Key Sharing Logic 321 shown in FIG. 11. At step 450 an appliance starts up, for example after recovering from a power outage or other failure. At step 452, the appliance requests an RMS key share, for example from a remote management server over a secure communication connection between the appliance and the remote management server. The remote management server releases the RMS key share to the appliance at step 454, and notifies a remote system administrator user of the release of the RMS key share at step 456. The appliance then reconstructs the master encryption key at step 458 and completes its startup, including any local encryption or key wrapping that must be performed using the master encryption key.

Figure 14:
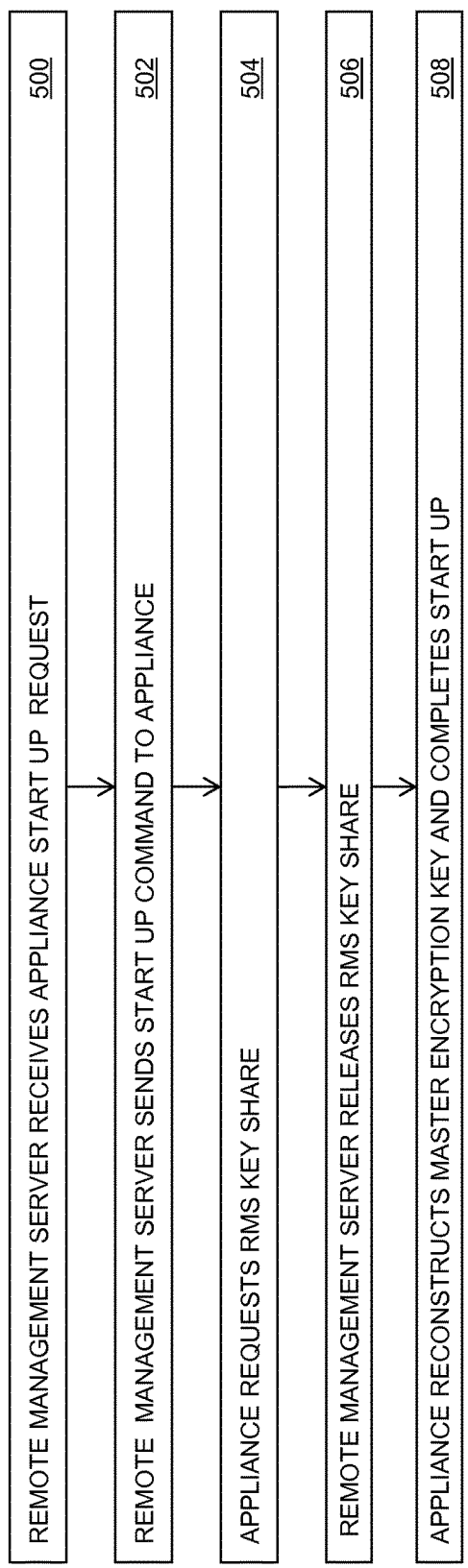
FIG. 14 is a flow chart showing a second example of steps performed to reconstruct a master encryption key to provide unattended start-up of an appliance in an illustrative embodiment.

FIG. 14 is a flow chart showing a second example of steps performed to reconstruct a master encryption key to provide unattended start-up of an appliance in an illustrative embodiment. The steps of FIG. 14 may, for example, be performed by the RMS Key Sharing Logic 310 and Appliance Key Sharing Logic 321 shown in FIG. 11. At step 500 the remote management system receives a request to start up an appliance, for example from a system administrator user. The remote management system transmits a startup command to the appliance at step 502. The appliance receives the startup command transmitted from the remote management server, and requests the RMS key share at step 504. The remote management server releases the RMS key share to the appliance at step 506, and the appliance uses the RMS key share and its local appliance key share to reconstruct the master encryption key and complete its start up at step 508.

Figure 15:
FIG. 15 is a flow chart showing steps performed to reconstruct a master encryption key to provide unattended set up of a new appliance in an illustrative embodiment.

FIG. 15 is a flow chart showing steps performed to reconstruct a master encryption key to provide unattended set up of a new appliance in an illustrative embodiment. The steps of FIG. 15 may, for example, be performed by the RMS Key Sharing Logic 310 and Appliance Key Sharing Logic 321 shown in FIG. 11. At step 550 the remote management server receives a request to set up a new appliance from a system administrator user. The remote management server reconstructs the master encryption key (e.g. in one of the ways described above with reference to the Remote Management Server 204 of FIG. 8), generates a new appliance key share from the existing master encryption key at step 552, and wraps the new appliance key share using the RMS key share at step 554. The remote management system transmits the new appliance key share, wrapped with the RMS key share, to the new appliance at step 556. The new appliance requests the RMS key share from the remote management server at step 558, and the remote management server releases the RMS key share to the new appliance at step 560. At step 562, the new appliance receives the RMS key share, and unwraps the new appliance key share using the RMS key share, so that it can reconstruct the master encryption key using the new appliance key share and the RMS key share, and use the reconstructed master encryption key to perform any local data encryption and/or key wrapping required to complete the setup of the new appliance at step 562.

Figure 16:
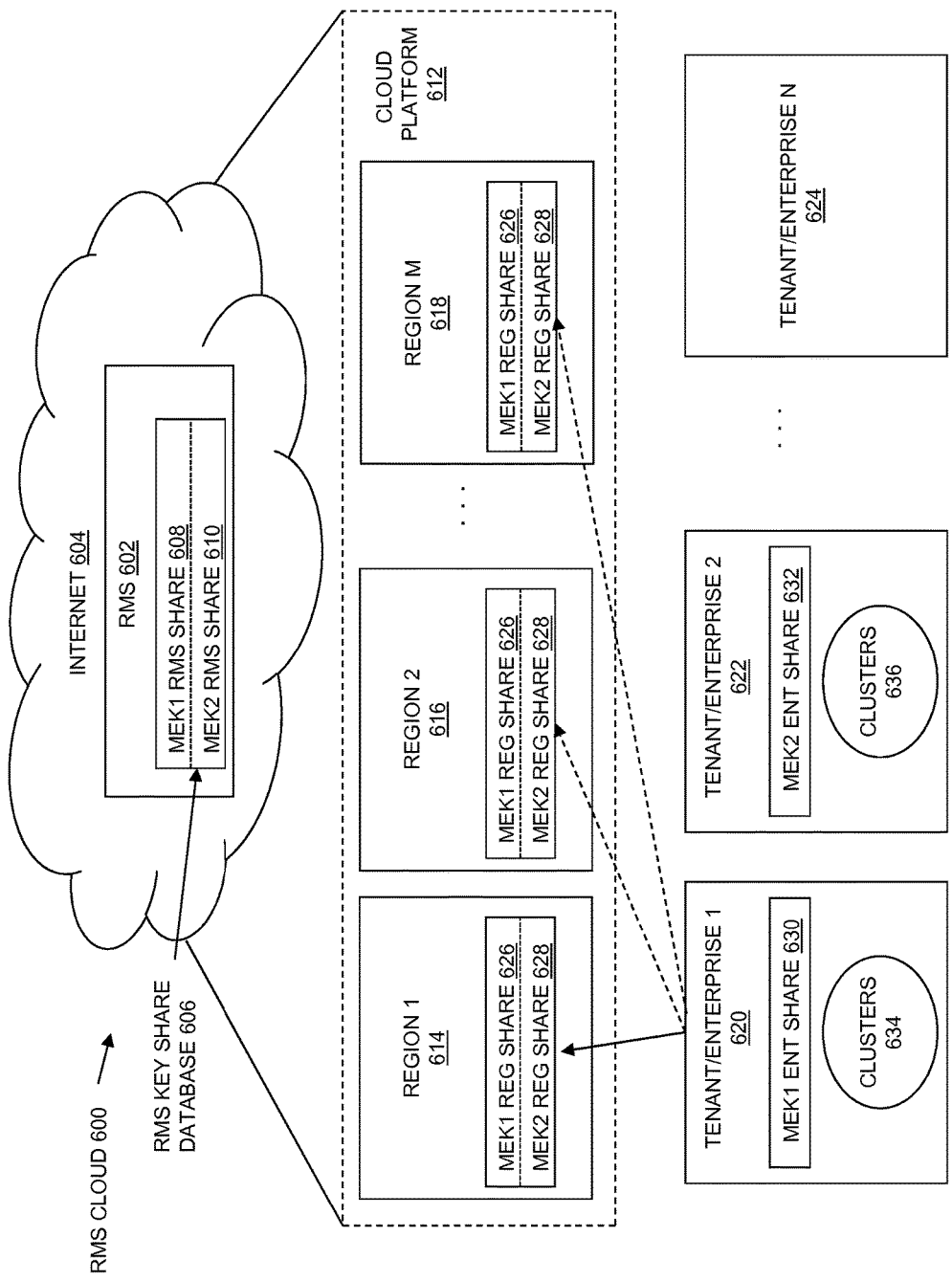
FIG. 16 is a block diagram showing a first example of components of the disclosed system in a multi-tenant cloud computing environment.

FIG. 16 is a block diagram showing a first example of components of the disclosed system in a multi-tenant cloud computing environment. As shown in FIG. 16, a Remote Management Server Cloud 600 includes a Remote Management Server (RMS) 602 connected to an unsecure network such as the Internet 604. The RMS 602 includes an RMS Key Share Database 606. The RMS 602 supports multi-tenancy and services multiple cloud tenants. The RMS 602 may be deployed in the Cloud Platform 612, and may further be distributed across multiple cloud regions within the Cloud Platform 612. In this way the Cloud Platform 612 may be used by the RMS 602 to reliably make master encryption key shares available to multiple cloud tenants.

Each cloud tenant may include or consist of an enterprise, and the example of FIG. 16 shows tenants including Tenant/Enterprise 1 620, Tenant/Enterprise 2 622, through Tenant/Enterprise N 624. Each tenant/enterprise may include one or more clusters of managed devices located on one or more enterprise communication networks that are secure and under the control of the respective tenant/enterprise. For example, Tenant/Enterprise 1 620 may include some number of managed devices within Clusters 634, Tenant/Enterprise 2 622 may include some number of managed devices within Clusters 636, etc.

The Cloud Platform 612 may be provided using any appropriate type of cloud computing platform, including but not limited to Microsoft® Azure, Amazon® Web Services (AWS), or the like.

As shown in FIG. 16, the Cloud Platform 612 may be embodied using an architecture that includes a number of distinct cloud "regions", shown for purposes of illustration as Region 1 614, Region 2 616, through Region M 618. Each of the cloud regions shown in FIG. 16 may consist of a separate set of cloud resources (e.g. server systems, etc.) that are located in a specific corresponding geographic region, such as US East (some portion of the eastern United States), US West (some portion of the western United States), Brazil, Europe, etc. The resources within each cloud region of the Cloud Platform 612 are isolated and operate independently, so that a given cloud region's data and processing are contained and performed within the corresponding geographic region. If the cloud resources within one cloud region fail or otherwise become unavailable, such an outage does not compromise the ability of resources from other cloud regions to provide a given service, e.g. provide a share of a master encryption key to a requesting managed device.

The cloud regions shown in FIG. 16 may also or alternatively be embodied as "availability zones", which are distinct centers for providing services within an AWS cloud platform, and which are similarly isolated from each other to prevent service outages from spreading across resources contained in different availability zones.

During operation of one embodiment of the components shown in FIG. 16, the disclosed system generates a master encryption key for each tenant/enterprise. The master encryption key for each tenant is split into at least two shares, with one share being duplicated throughout multiple regions as a "region share", and a second one of the shares being transmitted to the tenant/enterprise. The resources of each cloud region of Cloud Platform 612 accordingly include a key share store/database for storing the region key shares for that region.

As shown in the example of FIG. 16, a master encryption key MEK1 generated for Tenant/Enterprise 1 620 is split such that MEK1 RMS Share 608 is stored in the RMS Key Share Database 606, and may also be copied to a single region share that is stored in each region. In this regard FIG. 16 shows MEK1 Region Share 626, which is copied to and stored in each of Region 1 614, Region 2 616, through Region M 618. A second share of MEK1 is stored as MEK1 Enterprise Share 630 within Tenant/Enterprise 1 620. When a managed device in one of the Clusters 634 located in Tenant/Enterprise 1 620 needs to access another share of MEK1 to combine with MEK1 Enterprise Share 630 in order to reconstruct MEK1, a copy of MEK1 Region Share

626 may be obtained from any one of Region 1 614, Region 2 616 through Region M 618. Accordingly, a failure of some subset of the regions in Cloud Platform 612 will not prevent a managed device in Tenant/Enterprise 1 620 from obtaining a copy of MEK1 Region Share 626 that may be used to reconstruct the master encryption key MEK1.

Similarly, a master encryption key MEK2 may be generated for Tenant/Enterprise 2 622, and split into at least two shares such that an RMS share MEK2 RMS Share 610 is generated and may be duplicated throughout the multiple regions of Cloud Platform 612 as MEK2 Region Share 628.

Figure 17:
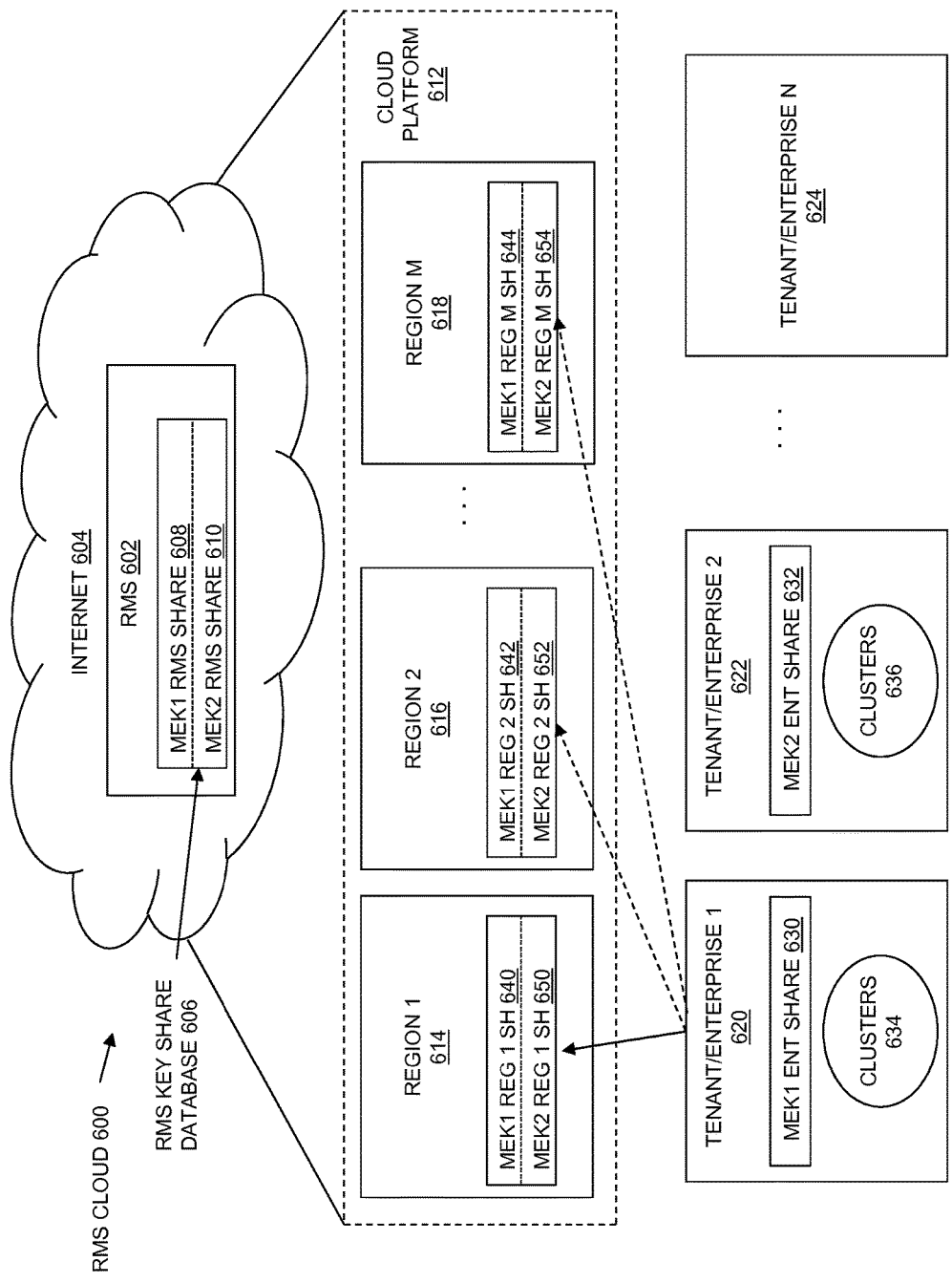
FIG. 17 is a block diagram showing a second example of components of the disclosed system in a multi-tenant cloud computing environment.

FIG. 17 is a block diagram showing a second example of components of the disclosed system in a multi-tenant cloud computing environment. In one embodiment illustrated by FIG. 17, a master encryption key is generated for each tenant/enterprise, and then split such that M+1 shares are created, where M is the number of regions in the Cloud Platform 612. In such an embodiment, a different share of the master encryption key may be stored in each cloud region. FIG. 17 accordingly shows that for MEK1, Region 1 614 stores MEK1 Region 1 Share 640, Region 2 616 stores MEK1 Region 2 Share 642, and so on through Region M 618, which is shown storing MEK1 Region M Share 644. Similarly, for MEK2, Region 1 614 stores MEK2 Region 1 Share 650, Region 2 616 stores MEK2 Region 2 Share 652, and so on through Region M 618, which is shown storing MEK2 Region M Share 654. While the above description of the components shown in FIG. 16 and FIG. 17 is with regard to embodiments in which a single master encryption key share is sent to and stored within each tenant, the disclosed system may alternatively be embodied such that multiple key shares are sent to each tenant. For example, a different master encryption key share may be sent to and stored in each one of multiple clusters contained within each tenant/enterprise. In another alternative embodiment, a different master encryption key share may be sent to and stored in each managed device contained within each tenant/enterprise.

When requesting a region key share from the Cloud Platform 612, a managed device need not make the request to a specific region within the Cloud Platform 612. Instead, a single request may be issued from a given managed device to the Cloud Platform 612, and the Cloud Platform 612 will route the request to an appropriate and functioning cloud region, for example based on Domain Name System (DNS) load-balancing and failover configuration. Accordingly, a managed device does not need to know the address of each region or availability zone within the Cloud Platform 612. For example, the disclosed system may be embodied using Infrastructure as a Service (IaaS) technologies that provide a "traffic manager" that maps names to Internet Protocol (IP) addresses, and that utilizes DNS.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above. For example, while the above description uses the term "appliance" to refer to certain illustrative managed devices in specific embodiments, the disclosed system is not limited to embodiments involving managed devices referred to or known as "appliances". The "appliances" in the preceding examples are only examples of the various types of managed devices that various embodiments may include. Managed devices in embodiments of the disclosed system may accordingly include or consist of various other specific types of managed devices, such as, for example, set-top boxes that are remotely managed by a cable company/service provider, and that may contain sensitive data, encrypted using a master encryption key that is split according to the disclosed system, with the resulting shares distributed between server systems of the cable company/service provider and the set-top boxes. Another example of a managed device that may be part of an embodiment of the disclosed system is a mobile device, such as, for example, a mobile phone, in which case the relevant enterprise may, for example, be a wireless telecommunications facilities-based service provider or the like. The preceding examples do not constitute an exhaustive list, and those skilled in the art will recognize that other types of managed devices may be used as may be appropriate for specific deployments or execution environments.

Similarly, the remote management servers used in the above description are only examples of the various specific types of servers that may be used in specific embodiments of the disclosed system. Accordingly, such server systems may, for example, include servers under the control of a cable company or other type of service provider, as in an embodiment in which the managed devices include set-top boxes, and/or under the control of a wireless telecommunications service provider, as in an embodiment in which the managed devices include mobile devices such as mobile phones or the like.

And it will also be recognized that the term "enterprise" may refer to any organization or group of users that is associated with, in control of, and/or uses at least one server and/or at least one managed device, such as the aforementioned, business, company or corporation (e.g. cable company, wireless service provider, etc.). In addition, as also set forth above, in an embodiment provided in a cloud computing environment, each enterprise may be embodied as an individual tenant within a multitenant software architecture. In such a cloud-based embodiment, individual enterprises may operate by using one or more shared applications or services, and the operations performed by the remote management server may be provided to the enterprises and/or associated managed devices as at least part of one or more cloud-based services.

It should further be understood that the disclosed system may be embodied to support protection of data belonging to any specific number of users. For example, in embodiments in which the managed devices themselves include or consist of servers, such as what are sometimes referred to and/or known as "managed servers" and/or "enterprise appliances", the disclosed system may operate to protect data belonging to relatively large numbers of users. In such embodiments, a given master encryption key may, for example, be the same for all users, and there may further be a hierarchy of encryption keys that are unique per-user or per-user device, and that may each be wrapped using the master encryption key.

Alternatively, in embodiments in which the managed devices include or consist of what are sometimes referred to and/or known as "endpoint" type devices in a distributed computing system, the disclosed system may operate to protect data belonging to a single user, or to a small group of users sharing the same device. In such embodiments, the master encryption key may be unique per user or unique per device. Thus there is disclosed a new system for protecting master encryption keys in a distributed computing environment. The disclosed system provides various advantages, including the following:

1) Unattended appliance start-up supports improved scalability;

2) Since the master encryption key is not stored on the remote management server or any appliance, attacks on the persistent store of either the remote management server or any individual appliance do not compromise the master encryption key since knowledge of less than the threshold number of key shares required to reconstruct the master encryption key does not expose any information about the master encryption key;

3) Security requirements for protecting key shares can be effectively met using system-level and network access-controls; and 4) The master encryption key may be destroyed after the key shares are distributed, and thus the master encryption key is not stored anywhere and is not transferred over the network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The disclosed system can take the form of an entirely software-based embodiment, an entirely hardware-based embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of protecting master encryption keys in a distributed computing environment, comprising:
   generating, by processing circuitry, a master encryption key;
   splitting the master encryption key into multiple key shares, wherein the master key can be reconstructed using at least two of the key shares;
   storing at least one of the key shares as a server key share in a server located in an untrusted network;
   transmitting individual ones of the other key shares over secure connections to respective individual ones of a plurality of managed devices, the managed devices located in at least one trusted network, to be securely stored on the managed devices as managed device key shares;
   destroying the master encryption key;
   receiving, by the server from one of the managed devices, a request for the server key share;
   authenticating, by the server, the request for the server key share;
   in response to the request for the server key share being authenticated, transmitting, by the server, the server key share to the requesting managed device over one of the secure connections;
   wherein the master encryption key is associated with an enterprise;
   wherein a plurality of clusters are controlled by the enterprise; and
   wherein transmitting individual ones of the other key shares comprises transmitting an individual one of the other key shares to each one of a plurality of managed devices located within multiple ones of the clusters operated by the enterprise.

2. The method of claim 1, further comprising:
   sending, by the server in response to transmitting the server key share to the requesting managed device, an alert to at least one device associated with at least one system administrator, wherein the alert includes information associated with the managed device that transmitted the request for the server key share.

3. The method of claim 2, wherein the alert further comprises an identifier of the enterprise associated with the master encryption key, an address of the managed device that transmitted the request for the server key share, information used to authenticate the request for the server key share, and a time of the request for the server key share.

4. The method of claim 1, further comprising:
sending, by the server in response to receiving the request for the server key share and prior to transmitting the server key share, to at least one device associated with at least one system administrator, a request for approval for the server to share the server key share with the managed device that transmitted the request;
receiving, by the server, a confirmation message from a system administrator indicating that the server key share may be shared by the server with the requesting managed device;
authenticating, by the server, the confirmation message from the system administrator; and
wherein the transmitting of the server key share to the managed device is performed in response to authentication of the confirmation message received from the system administrator.

5. The method of claim 1, further comprising:
receiving, by the server from a system administrator, a request to set up a new managed device;
reconstructing the master encryption key, by the server in response to receiving the request to set up the new managed device, and based on the server key share and at least one other key share;
generating, in response to the reconstructed master encryption key, a new share of the master encryption key; and
sending the new share of the master encryption key to the new managed device.

6. The method of claim 5, further comprising:
requesting, by the server, at least one managed device key share from at least one of the managed devices;
receiving, by the server, the at least one requested managed device key share from the at least one of the managed devices; and
wherein the at least one other key share comprises the at least one managed device key share received from the at least one of the managed devices.

7. The method of claim 5, further comprising:
receiving, by the server, an administrator password;
generating, by the server, an administrator password-based share of the master encryption key; and
wherein the at least one at least one other key share comprises the administrator password-based share of the master encryption key.

8. The method of claim 5, further comprising:
wrapping the new share of the master encryption key with the server key share prior to sending the new share of the master encryption key to the new managed device;
receiving, by the new managed device, the server key share over the secure connection;
unwrapping, by the new managed device, the new share of the master encryption key using the server key; and
using, by the new managed device, the new share of the master encryption key together with the server key share to reconstruct the master encryption key.

9. The method of claim 1, further comprising:
wherein the distributed computing environment includes a cloud computing platform having multiple regions; and
wherein storing at least one of the key shares as a server key share in a server includes storing a copy of the server key share in each of the multiple regions within the cloud computing platform.

10. The method of claim 1, further comprising:
wherein the distributed computing environment includes a cloud computing platform having a number of regions;
wherein splitting the master encryption key into multiple key shares includes generating a number of key shares at least as large as the number of regions in the cloud computing platform; and
wherein storing at least one of the key shares as a server key share in a server includes storing a different key share in each one of the regions within the cloud computing platform.

11. A remote management system, comprising:
at least one interface to an untrusted network;
memory;
control circuitry coupled to the memory, the memory storing instructions for protecting master encryption keys in a distributed computing environment which, when carried out by the control circuitry, cause the control circuitry to:
generate a master encryption key,
split the master encryption key into multiple key shares, wherein the master key can be reconstructed using at least two of the key shares,
store at least one of the key shares as a server key share,
transmit individual ones of the other key shares through the interface to the untrusted network over secure connections to respective individual ones of a plurality of managed devices, the managed devices located in at least one trusted network, to be securely stored on the managed devices as managed device key shares,
destroy the master encryption key,
receive, from one of the managed devices, a request for the server key share,
authenticate the request for the server key share, and
in response to the request for the server key share being authenticated, transmit the server key share to the requesting managed device over one of the secure connections;
wherein the master encryption key is associated with an enterprise;
wherein a plurality of clusters are controlled by the enterprise; and
wherein the control circuitry transmits individual ones of the other key shares by transmitting an individual one of the other key shares to each one of a plurality of managed devices located within multiple ones of the clusters operated by the enterprise.

12. The remote management system of claim 11, further comprising:
a cloud computing platform having multiple regions; and
wherein storing at least one of the key shares as a server key share in a server includes storing a copy of the server key share in each of the multiple regions within the cloud computing platform.

13. The remote management system of claim 11, further comprising:
a cloud computing platform having a number of regions;
wherein splitting the master encryption key into multiple key shares includes generating a number of key shares at least as large as the number of regions in the cloud computing platform; and
wherein storing at least one of the key shares as a server key share in a server includes storing a different key share in each one of the regions within the cloud computing platform.

14. The remote management system of claim 11, wherein the instructions, when carried out by the control circuitry, further cause the control circuitry to send, in response to transmitting the server key share to the requesting managed device, an alert to at least one device associated with at least one system administrator, wherein the alert includes information associated with the managed device that transmitted the request for the server key share.

15. The remote management system of claim 14, wherein the alert further comprises an identifier of the enterprise associated with the master encryption key, an address of the managed device that transmitted the request for the server key share, information used to authenticate the request for the server key share, and a time of the request for the server key share.

16. The remote management system of claim 11, wherein the instructions, when carried out by the control circuitry, further cause the control circuitry to:
send, in response to receiving the request for the server key share and prior to transmitting the server key share, to at least one device associated with at least one system administrator, a request for approval for the server to share the server key share with the managed device that transmitted the request;
receive a confirmation message from a system administrator indicating that the server key share may be shared by the server with the requesting managed device;
authenticate the confirmation message from the system administrator; and
wherein the server key share is transmitted to the managed device in response to authentication of the confirmation message received from the system administrator.

17. The remote management system of claim 11, wherein the instructions, when carried out by the control circuitry, further cause the control circuitry to:
receive, from a system administrator, a request to set up a new managed device;
reconstruct the master encryption key in response to receiving the request to set up the new managed device, based on the server key share and at least one other key share;
generate, in response to the reconstructed master encryption key, a new share of the master encryption key; and
send the new share of the master encryption key to the new managed device.

18. The remote management system of claim 17, wherein the instructions, when carried out by the control circuitry, further cause the control circuitry to:
request at least one managed device key share from at least one of the managed devices; and
receive the at least one requested managed device key share from the at least one of the managed devices;
wherein the at least one other key share comprises the at least one managed device key share received from the at least one of the managed devices.

19. The remote management system of claim 17, wherein the instructions, when carried out by the control circuitry, further cause the control circuitry to:
receive an administrator password; and
generate an administrator password-based share of the master encryption key;
wherein the at least one at least one other key share comprises the administrator password-based share of the master encryption key.

20. A computer program product, comprising:
a non-transitory computer readable medium which stores a set of instructions for protecting master encryption keys in a distributed computing environment, the set of instructions, when carried out by computer circuitry, causing the computer circuitry to perform a method of:
generating, by processing circuitry, a master encryption key;
splitting the master encryption key into multiple key shares, wherein the master key can be reconstructed using at least two of the key shares;
storing at least one of the key shares as a server key share in a server located in an untrusted network;
transmitting individual ones of the other key shares over secure connections to respective individual ones of a plurality of managed devices, the managed devices located in at least one trusted network, to be securely stored on the managed devices as managed device key shares;
destroying the master encryption key;
receiving, by the server from one of the managed devices, a request for the server key share;
authenticating, by the server, the request for the server key share;
in response to the request for the server key share being authenticated, transmitting, by the server, the server key share to the requesting managed device over one of the secure connections;
wherein the master encryption key is associated with an enterprise;
wherein a plurality of clusters are controlled by the enterprise; and
wherein transmitting individual ones of the other key shares comprises transmitting an individual one of the other key shares to each one of a plurality of managed devices located within multiple ones of the clusters operated by the enterprise.

* * * * *